US012645043B2

(12) United States Patent
Huang et al.

(10) Patent No.: US 12,645,043 B2
(45) Date of Patent: Jun. 2, 2026

(54) CONNECTOR ASSEMBLY WITH IMPROVED LIGHT GUIDE ELEMENT

(71) Applicant: DONGGUAN LUXSHARE TECHNOLOGIES CO., LTD, Dongguan City (CN)

(72) Inventors: Bin Huang, Dongguan City (CN); Hongji Chen, Dongguan City (CN); Kunlin Yao, Dongguan City (CN); Cheng Li, Dongguan City (CN)

(73) Assignee: DONGGUAN LUXSHARE TECHNOLOGIES CO., LTD, Dongguan City (CN)

( * ) Notice: Subject to any disclaimer, the term of this patent is extended or adjusted under 35 U.S.C. 154(b) by 460 days.

(21) Appl. No.: 18/229,238

(22) Filed: Aug. 2, 2023

(65) Prior Publication Data

US 2025/0004224 A1     Jan. 2, 2025

(30) Foreign Application Priority Data

Jun. 27, 2023    (CN) .......................... 202310775228.7

(51) Int. Cl.
| | |
|---|---|
| *G02B 6/42* | (2006.01) |
| *H01R 12/57* | (2011.01) |
| *H01R 13/516* | (2006.01) |
| *H01R 13/6582* | (2011.01) |

(52) U.S. Cl.
CPC .......... *G02B 6/4284* (2013.01); *H01R 12/57* (2013.01); *H01R 13/516* (2013.01); *H01R 13/6582* (2013.01)

(58) Field of Classification Search
CPC .... H01R 12/57; H01R 13/516; H01R 13/658; H01R 13/6581; H01R 13/6582; H01R 13/717; H01R 13/7172; H01R 13/7175
See application file for complete search history.

(56) References Cited

U.S. PATENT DOCUMENTS

| | | | | |
|---|---|---|---|---|
| 8,335,416 | B2 * | 12/2012 | Shirk | ................... G02B 6/4292 |
| | | | | 385/32 |
| 8,870,595 | B2 * | 10/2014 | Schmitt | .............. H01R 13/6587 |
| | | | | 439/607.25 |
| 9,537,233 | B1 * | 1/2017 | Adrian | ................. H01R 12/712 |
| 10,355,428 | B2 * | 7/2019 | Fang | .................. H01R 12/7005 |
| 11,251,573 | B2 * | 2/2022 | Wu | ....................... H01R 13/518 |
| 2021/0066862 | A1 * | 3/2021 | Chen | .................. H01R 13/6599 |

FOREIGN PATENT DOCUMENTS

CN          104103919 A     10/2014

* cited by examiner

*Primary Examiner* — Renee S Luebke
*Assistant Examiner* — Paul D Baillargeon
(74) *Attorney, Agent, or Firm* — Birch, Stewart, Kolasch & Birch, LLP

(57) ABSTRACT

A connector assembly includes an electrical connector, a metal shielding cage and a light guide element. The electrical connector includes an insulating body and a number of conductive terminals. The insulating body includes a mounting surface configured to be mounted to a circuit board and an installation through hole. The light guide element includes a light pipe which is at least partially inserted into the installation through hole along a mating direction. The light guide pipe includes a light guide head and an end far away from the light guide head. The end is disposed adjacent to the light emitting element on the circuit board.

18 Claims, 29 Drawing Sheets

211

212

211

213       212

221

223

221

222    223

6

636

64

64a

635

8

CONNECTOR ASSEMBLY WITH IMPROVED LIGHT GUIDE ELEMENT

CROSS-REFERENCE TO RELATED APPLICATION

This patent application claims priority of a Chinese Patent Application No. 202310775228.7, filed on Jun. 27, 2023 and titled "CONNECTOR ASSEMBLY", the entire content of which is incorporated herein by reference.

TECHNICAL FIELD

The present disclosure relates to a connector assembly, which belongs to the technical field of connectors.

BACKGROUND

A connector assembly combination in the related art generally includes a circuit board and a connector assembly mounted to the circuit board. The connector assembly includes an electrical connector and a metal shielding cage surrounding a periphery of the electrical connector to play a shielding role. The metal shielding cage defines a receiving cavity configured to receive a mating connector. An extending direction of the receiving cavity is parallel to the circuit board.

In order to facilitate identification of the state of the connector assembly combination, the connector assembly combination in the related art further includes a light guide element. The light guide element is usually installed outside the metal shielding cage to avoid possible interference with the electrical connector during installation. However, this design results in a relatively large overall profile of the connector assembly combination.

SUMMARY

An object of the present disclosure is to provide a compact connector assembly.

In order to achieve the above object, the present disclosure adopts the following technical solution: a connector assembly configured to be mounted on a circuit board which is provided with a light emitting element, the connector assembly including: an electrical connector including an insulating body and a plurality of conductive terminals; the insulating body including a mounting surface configured to be mounted to the circuit board, a mating slot configured to receive a mating connector along a mating direction, and an installation through hole extending through the mounting surface along the mating direction; each conductive terminal including an elastic contact arm protruding into the mating slot and a tail portion configured to be mounted to the circuit board; a metal shielding cage shielding a periphery of the electrical connector; the metal shielding cage including a receiving cavity communicating with the mating slot; the receiving cavity and the mating slot being configured to accommodate the mating connector along the mating direction; the mating direction being perpendicular to the circuit board; and a light guide element including a light guide pipe which is at least partially inserted into the installation through hole along the mating direction; the light guide pipe including a light guide head located adjacent to a port of the receiving cavity and an end far away from the light guide head; the end being located adjacent to the light emitting element.

In order to achieve the above object, the present disclosure adopts the following technical solution: a connector assembly configured to be mounted on a circuit board which is provided with a light emitting element, the connector assembly including: an electrical connector including an insulating body and a plurality of conductive terminals; the insulating body including a mounting surface, a mating slot configured to receive a mating connector along a mating direction, and an installation through hole extending through the mounting surface along the mating direction; each conductive terminal including an elastic contact arm protruding into the mating slot; a metal shielding cage enclosing the electrical connector; the metal shielding cage including a receiving cavity communicating with the mating slot; the receiving cavity and the mating slot being configured to jointly accommodate the mating connector along the mating direction; the mating direction being perpendicular to the circuit board; and a light guide element including a light guide pipe which is at least partially inserted into the installation through hole along the mating direction; the light guide pipe including a light guide head located adjacent to a port of the receiving cavity and an end disposed facing the light emitting element along the mating direction.

Compared with the prior art, the insulating body of the present disclosure is provided with the installation through hole extending through the mounting surface; and the light pipe is at least partially inserted into the installation through hole along the mating direction. As a result, a space of the insulating body can be fully utilized to install the light pipe, and there is no need to install the light pipe outside the metal shielding cage, thereby improving the structural compactness of the connector assembly.

DETAILED DESCRIPTION

Figure 1:
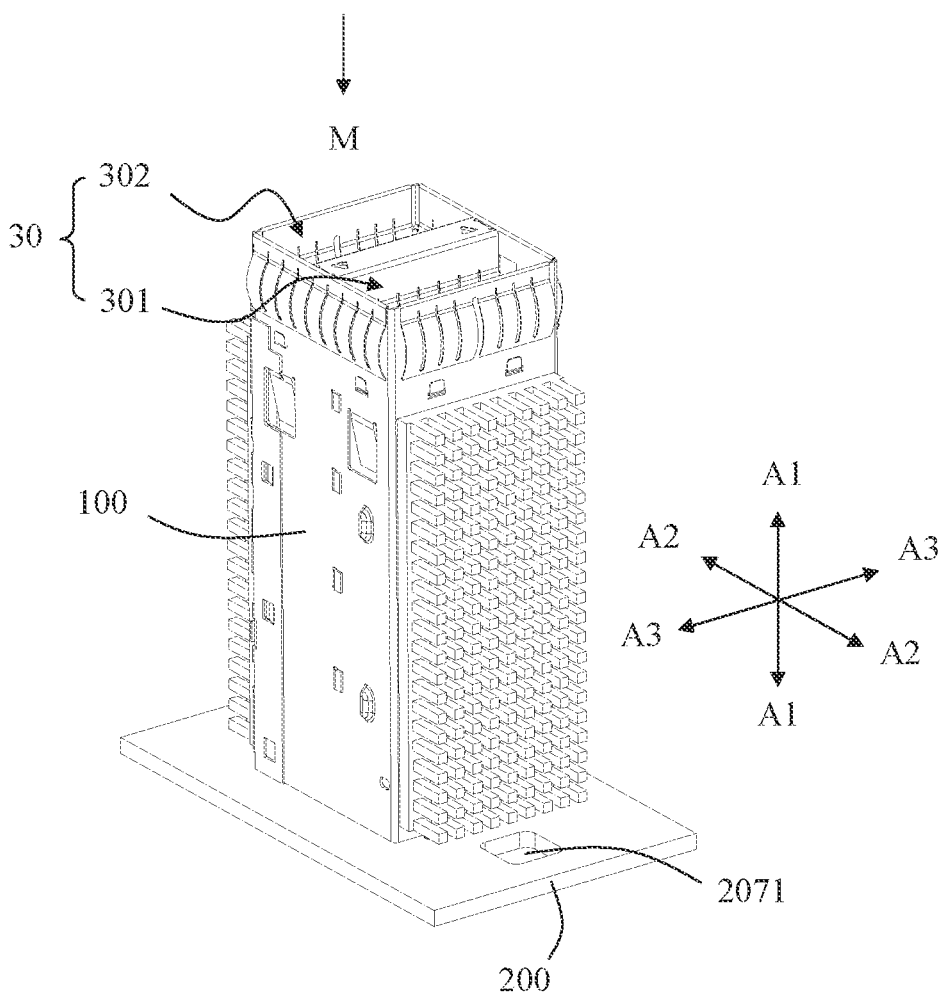
FIG. 1 is a schematic perspective view of a connector assembly combination in accordance with an embodiment of the present disclosure.
Figure 2:
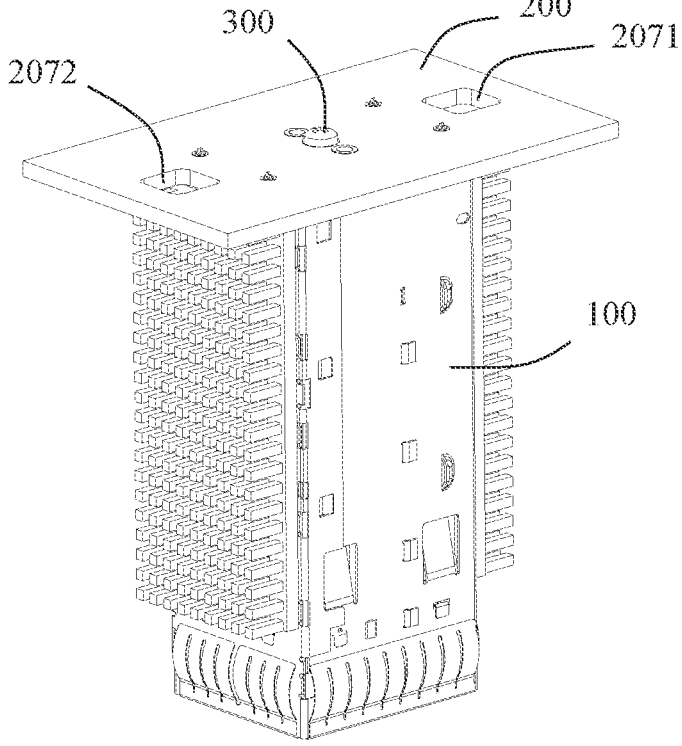
FIG. 2 is a schematic perspective view of FIG. 1 from another angle.
Figure 3:
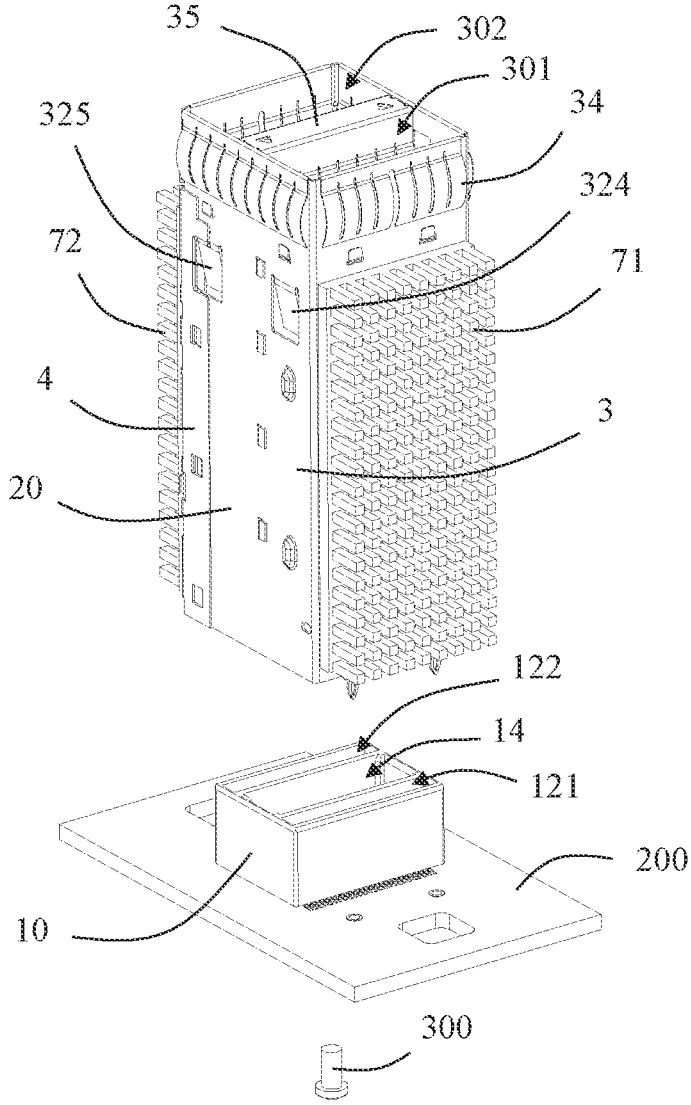
FIG. 3 is a partial perspective exploded view of FIG. 1.
Figure 4:
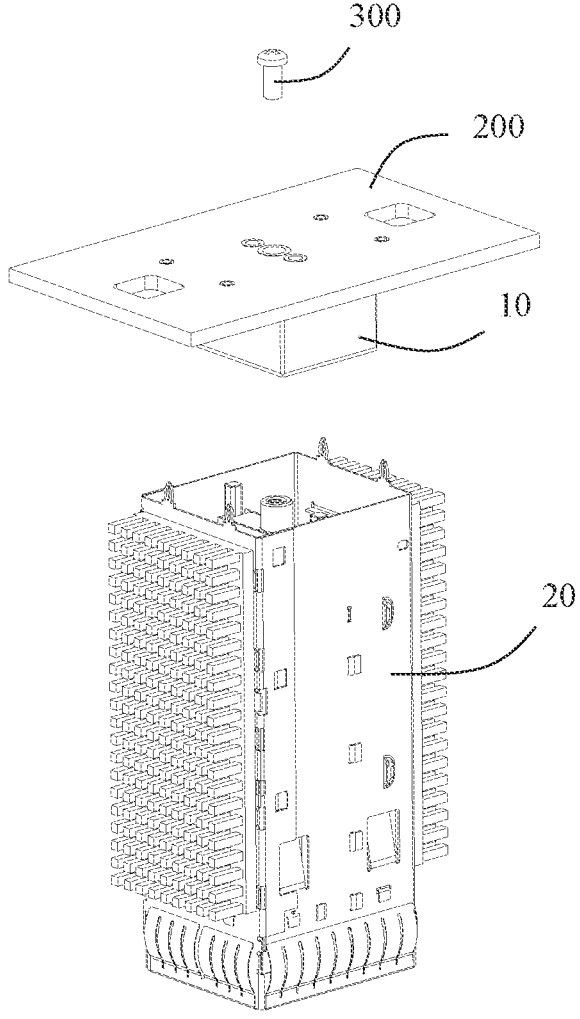
FIG. 4 is a partial perspective exploded view of FIG. 3 from another angle.
Figure 5:
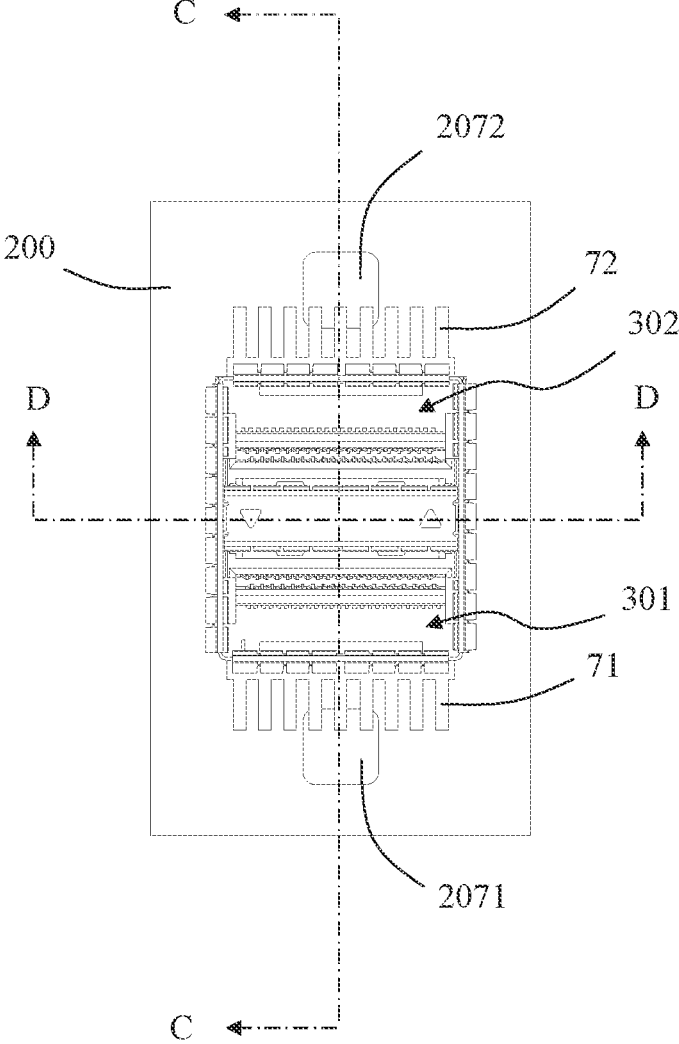
FIG. 5 is a top view of FIG. 1.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIG. 1 to FIG. 32, the present disclosure discloses a connector assembly combination, which includes a circuit board 200, a connector assembly 100 mounted to the circuit board 200, and a fastener 300 fixing the connector assembly 100 to the circuit board 200. The connector assembly 100 includes an electrical connector 10 and a metal shielding cage 20 covering a periphery of the electrical connector 10. It is understandable to those skilled in the art that in the illustrated embodiment of the present disclosure, the metal shielding cage 20 and the electrical connector 10 are installed on the circuit board 200, respectively. That is, there is no direct fixed relationship between the metal shielding cage 20 and the electrical connector 10. The metal shielding cage 20 defines a receiving cavity 30. The receiving cavity 30 is configured to accommodate a mating connector (not shown) along a mating direction M. For example, the mating connector is an SFP (Small Form Pluggable) plug connector. The mating direction M is parallel to a first direction A1-A1 (for example, a top-bottom direction). The first direction A1-A1 is perpendicular to the circuit board 200.

In the illustrated embodiment of the present disclosure, the connector assembly 100 has two ports. Correspondingly, the mating connector includes a first mating connector (not shown) and a second mating connector (not shown) for being inserted into the two ports. In the illustrated embodiment of the present disclosure, the first mating connector and the second mating connector are the same connector. However, the first mating connector and the second mating connector are arranged belly to belly, that is, the first mating connector rotates 180 degrees in a horizontal plane relative to the second mating connector.

Figure 6:
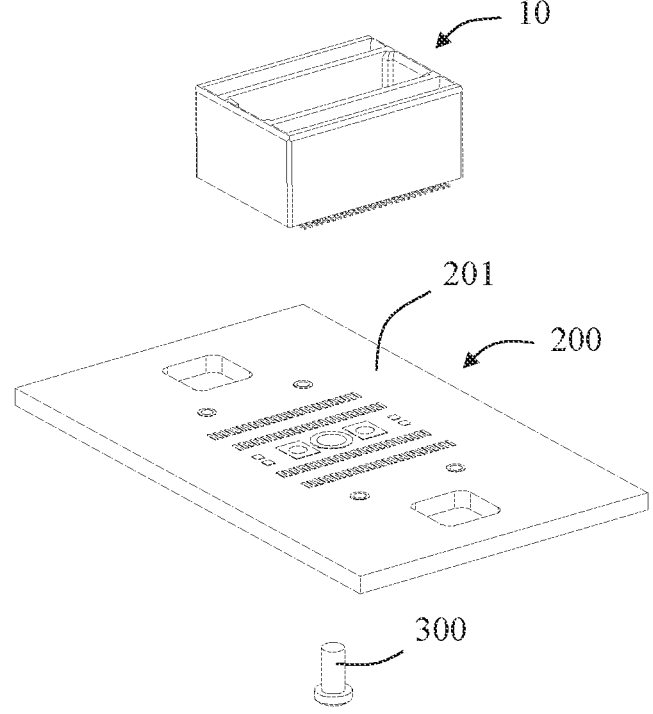
FIG. 6 is a perspective exploded view of a circuit board, an electrical connector and a fastener.
Figure 7:
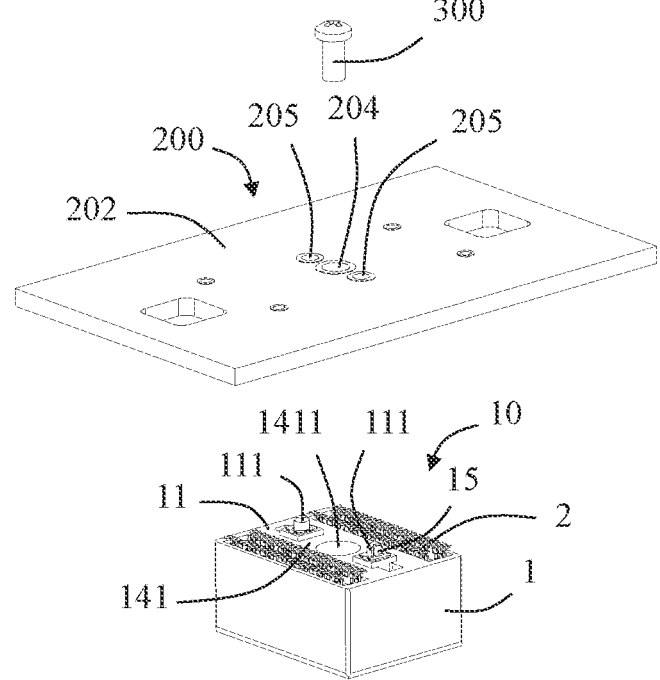
FIG. 7 is a perspective exploded view of FIG. 6 from another angle.
Figure 8:
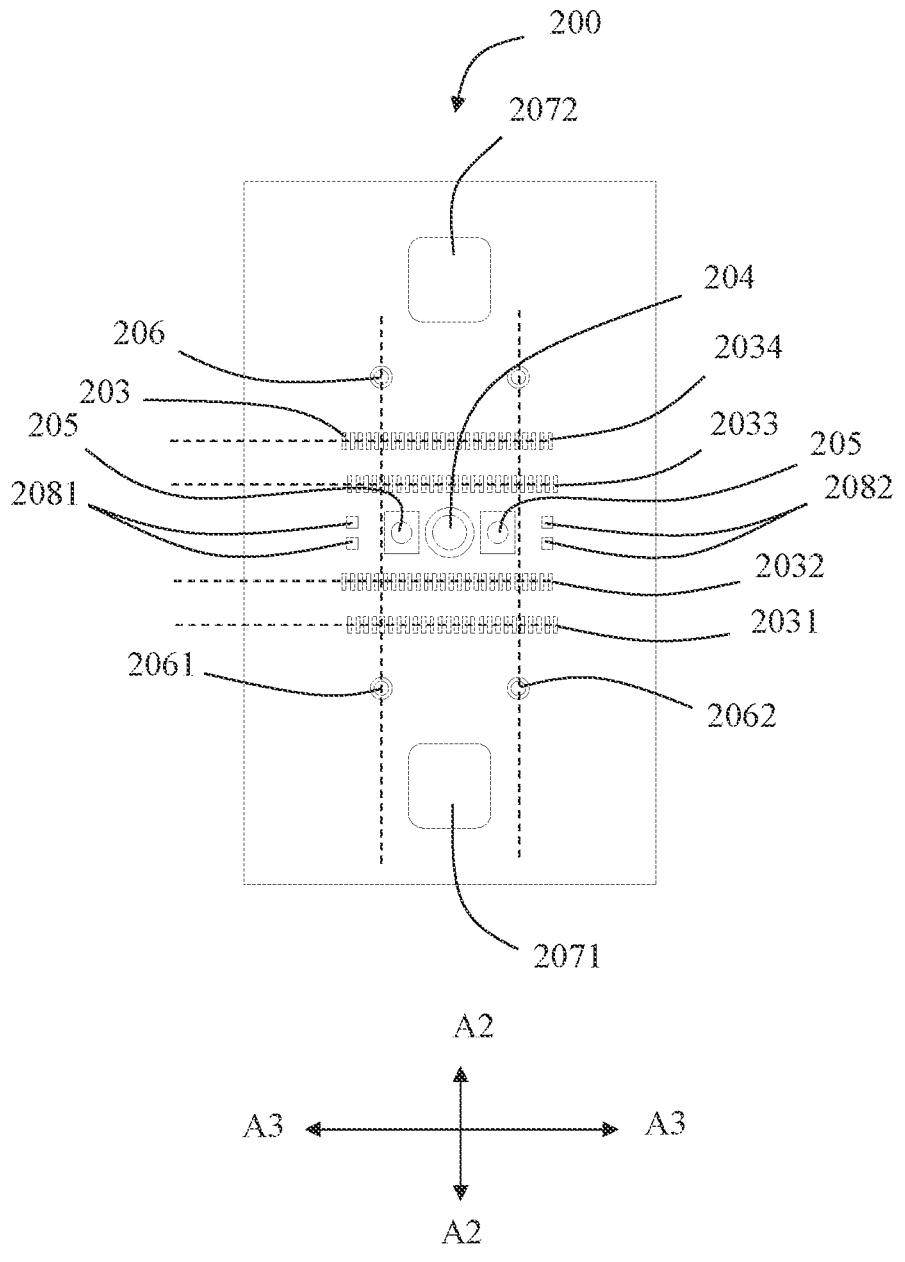
FIG. 8 is a top view of the circuit board in FIG. 6.

Referring to FIG. 6 to FIG. 8, the circuit board 200 includes a first surface 201 (for example, an upper surface), a second surface 202 (for example, a lower surface) opposite to the first surface 201, a plurality of conductive pads 203 exposed on the first surface 201, an installation through hole 204 extending through the first surface 201 and the second surface 202, a plurality of positioning holes 205 extending through the first surface 201 and the second surface 202, and a plurality of fixing holes 206 extending through the first surface 201 and the second surface 202. In addition, the circuit board 200 further includes a first heat dissipation through hole 2071 and a second heat dissipation through hole 2072 extending through the first surface 201 and the second surface 202. In an embodiment of the present disclosure, the circuit board 200 is a main circuit board on which a chip (not shown) and a plurality of electronic components are disposed. The plurality of electronic components include at least one first light emitting element 2081 and at least one second light emitting element 2082. In the illustrated embodiment of the present disclosure, the first light emitting element 2081 and the second light emitting element 2082 are both light emitting diodes. Two first light-emitting elements 2081 and two second light emitting elements 2082 are provided.

In the embodiment shown in the present disclosure, the plurality of conductive pads 203 include a first row of conductive pads 2031, a second row of conductive pads 2032, a third row of conductive pads 2033 and a fourth row of conductive pads 2034 which are arranged in sequence along a second direction A2-A2 (for example, a front-rear direction). The first row of conductive pads 2031, the second row of conductive pads 2032, the third row of conductive pads 2033 and the fourth row of conductive pads 2034 are parallel to each other.

The installation through hole 204 and the plurality of positioning holes 205 are located between the second row of conductive pads 2032 and the third row of conductive pads 2033 along the second direction A2-A2. The plurality of fixing holes 206 include a first row of fixing holes 2061 and a second row of fixing holes 2062. The first row of fixing holes 2061 and the second row of fixing holes 2062 are parallel to each other. The first light emitting element 2081 and the second light emitting element 2082 are respectively located on two sides of the plurality of positioning holes 205 along a third direction A3-A3 (for example, a left-right direction). In the illustrated embodiment of the present disclosure, each two of the first direction A1-A1, the second direction A2-A2 and the third direction A3-A3 are perpendicular with each other.

Figure 9:
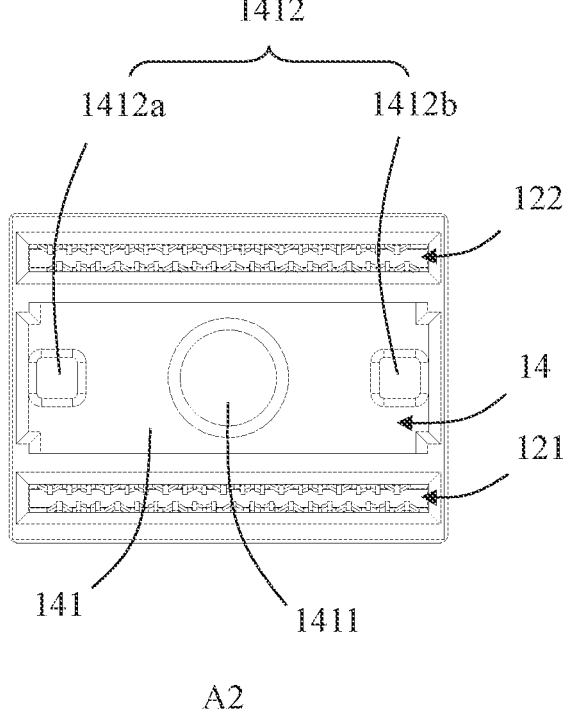
FIG. 9 is a top view of the electrical connector in FIG. 6.
Figure 9:
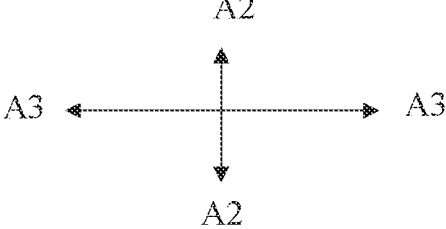
Figure 10:
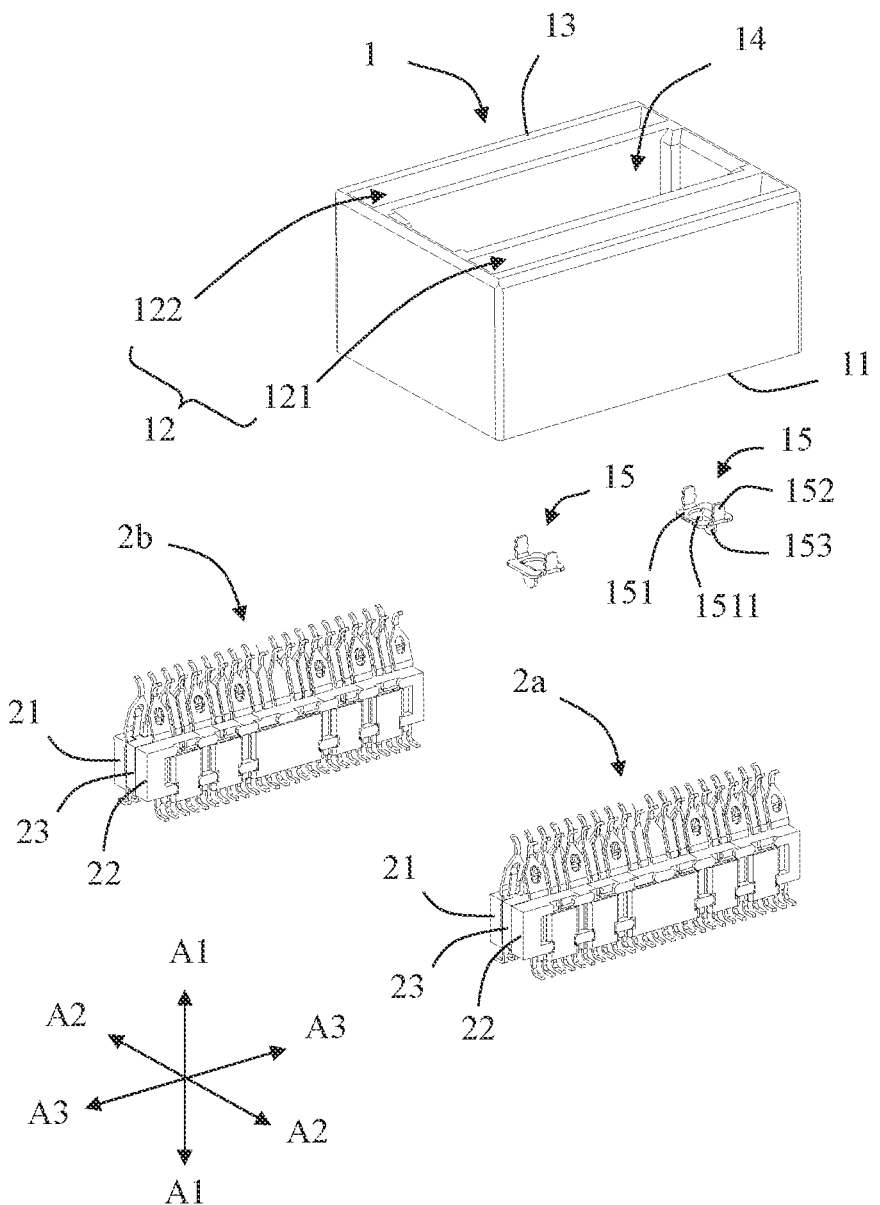
FIG. 10 is a partially exploded perspective view of the electrical connector shown in FIG. 6.

Referring to FIG. 7 and FIG. 9 to FIG. 22, in the illustrated embodiment of the present disclosure, the electrical connector 10 includes an insulating body 1 and a plurality of conductive terminals 2. The insulating body 1 includes a mounting surface 11 (such as a lower surface) configured to be mounted to the circuit board 200 and a plurality of positioning posts 111 protruding downwardly from the mounting surface 11. The positioning posts 111 are configured to be inserted into corresponding positioning holes 205 for positioning purpose. Referring to FIG. 7 and FIG. 10, in the embodiment shown in the present disclosure, the electrical connector 10 further includes a plurality of fixing members 15 fixed to the insulating body 1. Each fixing member 15 is made of metal material, and comprises a main body portion 151, a first fixing tab 152 bent from the main body portion 151 to one side, and a second fixing tab 153 bent from the main body portion 151 to the other side. The fixing members 15 are sleeved on corresponding positioning posts 111. Each main body portion 151 defines a through hole 1511 through which the positioning post 111 passes. The first fixing tab 152 is configured for being inserted and fixed in the insulating body 1. The second fixing tab 153 leans against a corresponding positioning post 111 to be inserted into a corresponding positioning hole 205 of the circuit board 200 together with the corresponding positioning post 111. The main body portion 151 is used for being soldered and fixed with a fixing pad on the circuit board 200.

In the illustrated embodiment of the present disclosure, the insulating body 1 includes a mating surface 13 (for example, an upper surface) opposite to the mounting surface 11, a receiving slot 14 extending through the mating surface 13, and a plurality of mating slots 12 extending through the mating surface 13. In the illustrated embodiment of the present disclosure, the mating slots 12 include a first mating slot 121 located on one side of the receiving slot 14 along the second direction A2-A2, and a second mating slot 122 is located on the other side of the receiving slot 14 along the second direction A2-A2. The insulating body 1 further includes a bottom wall 141 located at the bottom of the receiving slot 14. The bottom wall 141 defines a mounting hole 1411 extending through the bottom wall 141 along the first direction A1-A1, and a plurality of installation through holes 1412 extending through the bottom wall 141 along the first direction A1-A1. In the illustrated embodiment of the present disclosure, the mounting hole 1411 is aligned with the installation through hole 204 of the circuit board 200 along the first direction A1-A1. As shown in FIG. 9, the installation through holes 1412 include a first installation through hole 1412a and a second installation through hole

1412b which are located on two sides of the mounting hole 1411 along the third direction A3-A3, respectively. The mounting hole 1411, the first installation through hole 1412a and the second installation through hole 1412b all communicate with the receiving slot 14.

Referring to FIG. 10 to FIG. 22, in the embodiment shown in the present disclosure, the electrical connector 10 includes a first terminal module 21 assembled to the insulating body 1, a second terminal module 22 assembled to the insulating body 1, a first connection block 23 that assembles the first terminal module 21 and the second terminal module 22 into a whole, a third terminal module 24, a fourth terminal module 25, and a second connection block 26 that assembles the third terminal module 24 and the fourth terminal module 25 into a whole. In the illustrated embodiment of the present disclosure, the first terminal module 21, the second terminal module 22 and the first connection block 23 are assembled to form a first module 2a. The third terminal module 24, the fourth terminal module 25 and the second connection block 26 are assembled to form a second module 2b. The structure of the first module 2a and the second module 2b is the same, and only the first module 2a will be described below as an example.

Figure 11:
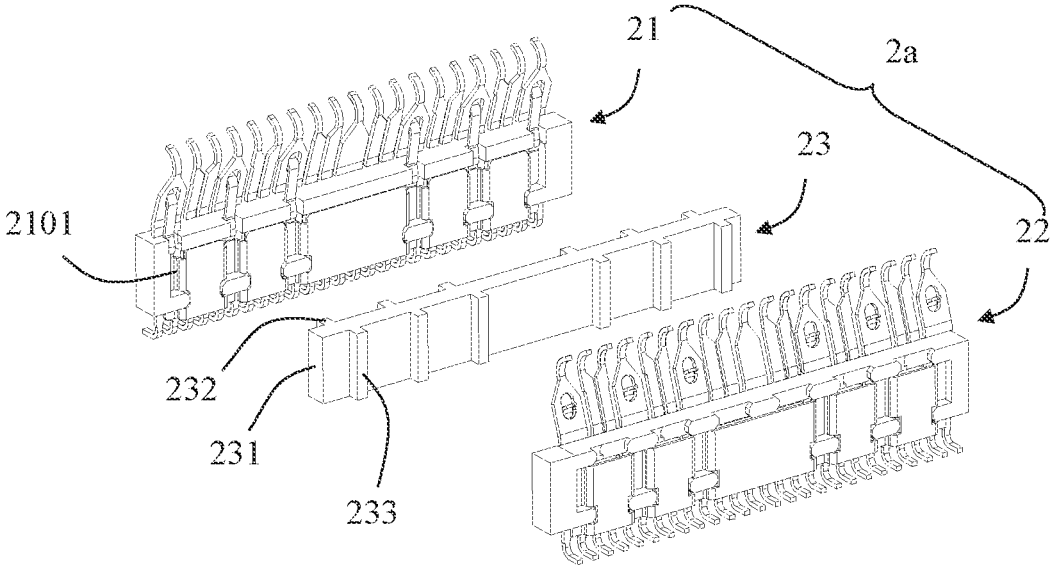
FIG. 11 is a partial perspective exploded view of a first module in FIG. 10.
Figure 17:
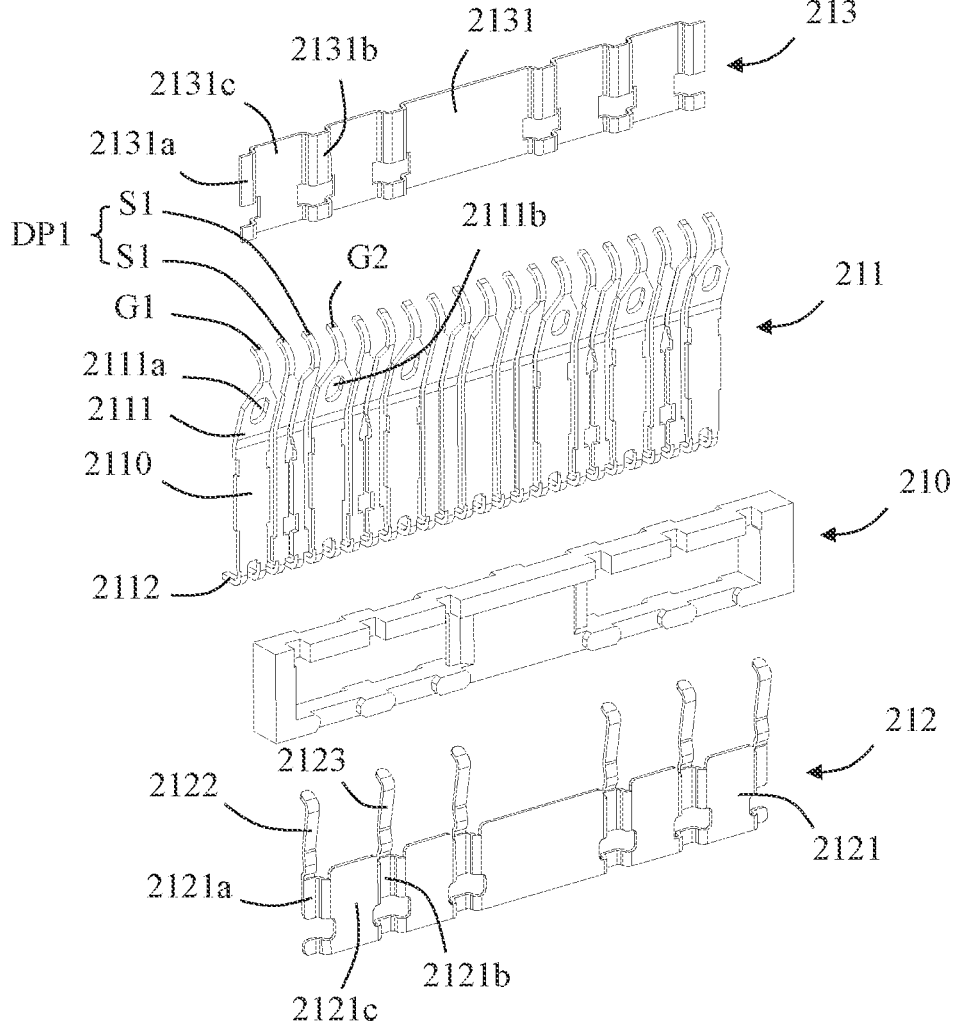
FIG. 17 is a perspective exploded view of a first terminal module in FIG. 11.
Figure 18:
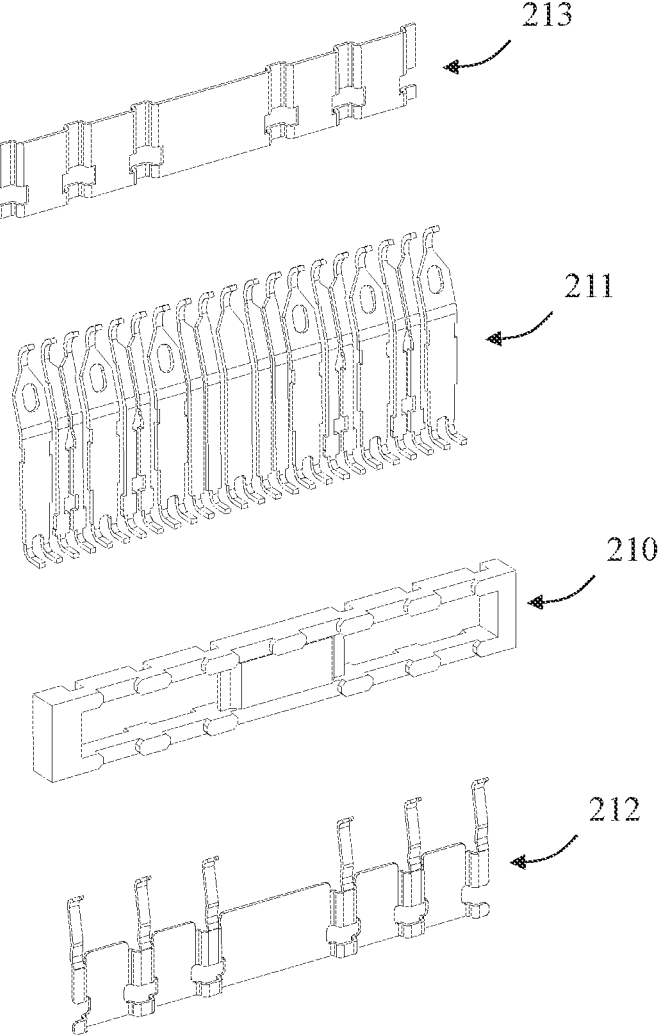
FIG. 18 is a perspective exploded view of FIG. 17 from another angle.

Referring to FIG. 17 and FIG. 18, the first terminal module 21 includes a first insulating block 210, a plurality of first conductive terminals 211 fixed to the first insulating block 210, a first ground sheet 212 fixed to one side of the first insulating block 210, and a second ground sheet 213 fixed to the other side of the first insulating block 210. In the illustrated embodiment of the present disclosure, the plurality of first conductive terminals 211 are insert-molded with the first insulating block 210. The first ground sheet 212 and the second ground sheet 213 are assembled to the first insulating block 210. The first insulating block 210 is installed and fixed to a bottom of the first mating slot 121. Of course, in other embodiment, the first conductive terminals 211, the first ground sheet 212 and the second ground sheet 213 may also be all insert-molded with the first insulating block 210. Alternatively, the first conductive terminals 211, the first ground sheet 212 and the second ground sheet 213 may also be assembled and fixed to the first insulating block 210. Referring to FIG. 11, in the embodiment shown in the present disclosure, a side of the first insulating block 210 facing the second terminal module 22 defines a plurality of first grooves 2101 extending upwardly.

Each first conductive terminal 211 includes a first fixing portion 2110, a first elastic contact arm 2111 extending from one end of the first fixing portion 2110, and a first tail portion 2112 extending from the other end of the first fixing portion 2110. The first fixing portion 2110 is at least partially fixed to the first insulating block 210. The first tail portion 2112 extends out of the first insulating block 210. In the illustrated embodiment of the present disclosure, the plurality of first conductive terminals 211 include a plurality of pairs of first differential signal terminals DP1, a plurality of first ground terminals G1 and a plurality of second ground terminals G2. Two sides of each pair of first differential signal terminals DP1 are associated with one first ground terminal G1 and one second ground terminal G2, respectively. Each pair of first differential signal terminals DP1 include two first signal terminals S1. A width of the first ground terminal G1 is generally larger than a width of each of the first signal terminals S1. A width of the second ground terminal G2 is generally larger than the width of each of the first signal terminals S1. With such configuration, the first terminal module 21 can better transmit high-speed signals, reduce external interference, and improve signal transmission quality. In the illustrated embodiment of the present disclosure, the first elastic contact arm 2111 of the first ground terminal G1 defines a first through hole 2111a. The first elastic contact arm 2111 of the second ground terminal G2 defines a second through hole 2111b.

The first ground sheet 212 includes a first base portion 2121, a plurality of first grounding elastic arms 2122 integrally extending from the first base portion 2121, and a plurality of second grounding elastic arms 2123 integrally extending from the first base portion 2121. The first base portion 2121 includes a first contact portion 2121a in contact with the first fixing portion 2110 of the first ground terminal G1, a second contact portion 2121b in contact with the first fixing portion 2110 of the second ground terminal G2, and a first raised portion 2121c connecting the first contact portion 2121a and the second contact portion 2121b. By the first contact portion 2121a and the second contact portion 2121b being in contact with corresponding first ground terminal G1 and the second ground terminal G2, it is realized that all of the first ground terminals G1 and all of the second ground terminals G2 are connected in series, thereby improving the ground shielding effect. The first raised portion 2121c is configured to avoid the first differential signal terminals DP1, so as to avoid a short circuit due to contact with the first differential signal terminals DP1.

In the illustrated embodiment of the present disclosure, the first grounding elastic arm 2122 is inserted into the first through hole 2111a so as to contact the first elastic contact arm 2111 of the first ground terminal G1. The second grounding elastic arm 2123 is inserted into the second through hole 2111b so as to contact with the first elastic contact arm 2111 of the second ground terminal G2.

The second ground sheet 213 includes a second base portion 2131. The second base portion 2131 includes a third contact portion 2131a in contact with the first fixing portion 2110 of the first ground terminal G1, a fourth contact portion 2131b in contact with the first fixing portion 2110 of the second ground terminal G2, and a second raised portion 2131c connecting the third contact portion 2131a and the fourth contact portion 2131b. By the third contact portion 2131a and the fourth contact portion 2131b being in contact with corresponding first ground terminal G1 and the second ground terminal G2, the grounding area is increased, thereby further improving the ground shielding effect. The second raised portion 2131c is used to avoid the first differential signal terminal DP1, so as to avoid a short circuit due to contact with the first differential signal terminal DP1.

Figure 21:
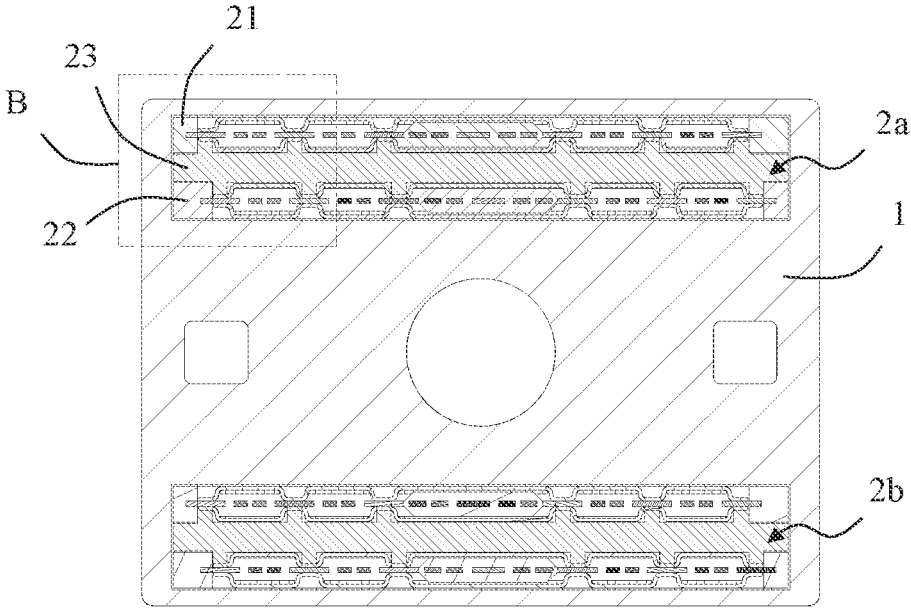
FIG. 21 is a schematic sectional view taken along line C-C in FIG. 5.
Figure 22:
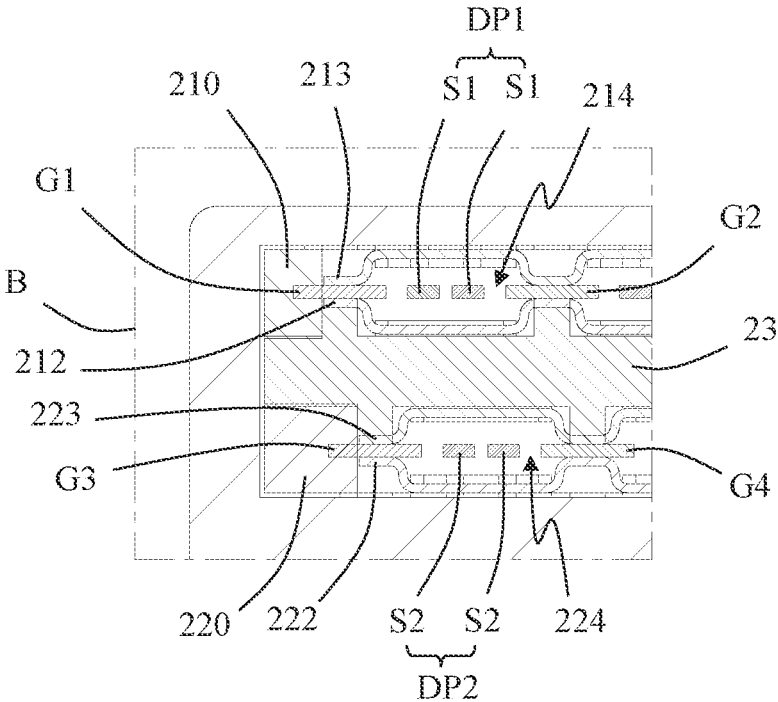
FIG. 22 is a partially enlarged view of a frame part B in FIG. 21.

It is understandable to those skilled in the art that, in the embodiment shown in the present disclosure, the first base portion 2121 of the first ground sheet 212 and the second base portion 2131 of the second ground sheet 213 are symmetrically arranged on two sides of the first conductive terminals 211, respectively. As far as the first fixing portion 2110 of the first ground terminal G1 is concerned, two sides of the first fixing portion 2110 of the first ground terminal G1 are in contact with the first contact portion 2121a of the first ground sheet 212 and the third contact portion 2131a of the second ground sheet 213, respectively. As far as the first fixing portion 2110 of the second ground terminal G2 is concerned, two sides of the first fixing portion 2110 of the second ground terminal G2 are in contact with the second contact portion 2121b of the first ground sheet 212 and the fourth contact portion 2131b of the second ground sheet 213, respectively. As shown in FIG. 21 and FIG. 22, each pair of first differential signal terminals DP1 is circumferentially surrounded by a first annular shielding cavity 214 which is formed by the first ground terminal G1, the second ground terminal G2, the first ground sheet 212 and the second ground sheet 213 so as to greatly reduce the distortion during signal transmission.

Figure 12:
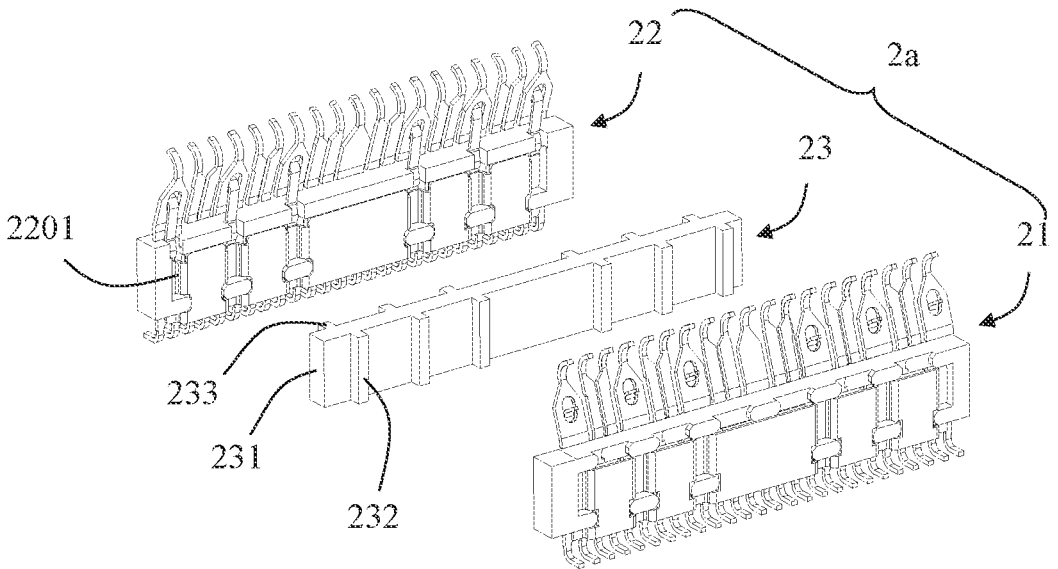
FIG. 12 is a partial perspective exploded view of FIG. 11 from another angle.
Figure 13:
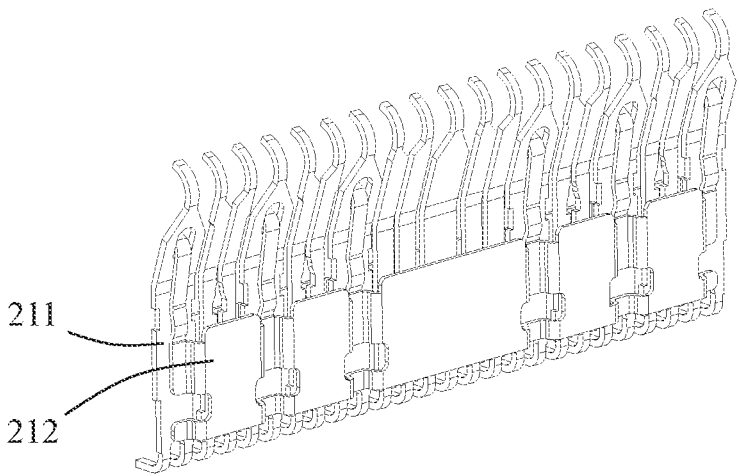
FIG. 13 is a schematic perspective view after removing a first insulating block in FIG. 12.
Figure 14:
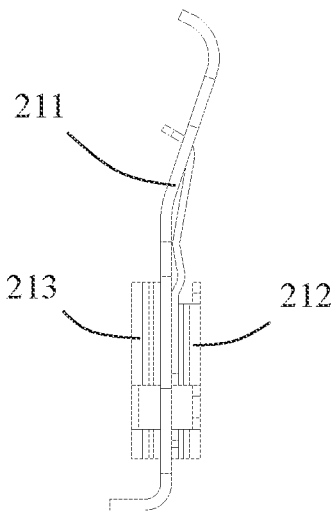
FIG. 14 is a left view of FIG. 13.
Figure 15:
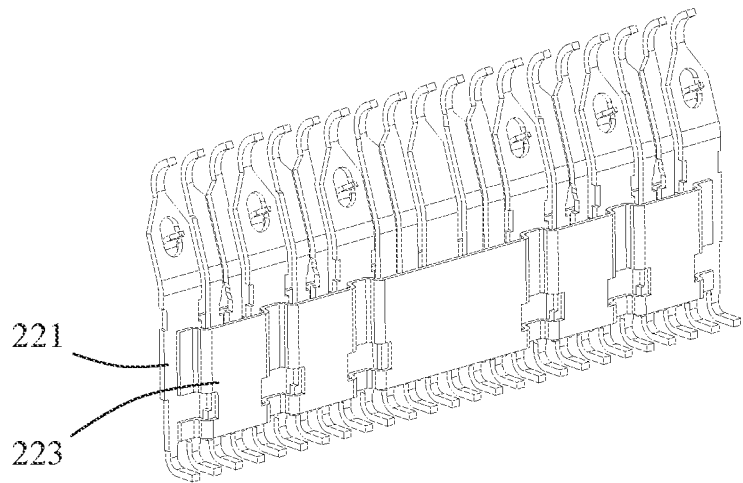
FIG. 15 is a schematic perspective view after removing a second insulating block in FIG. 12.
Figure 16:
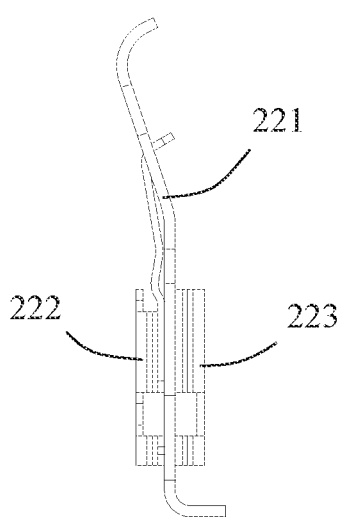
FIG. 16 is a left view of FIG. 15.
Figure 19:
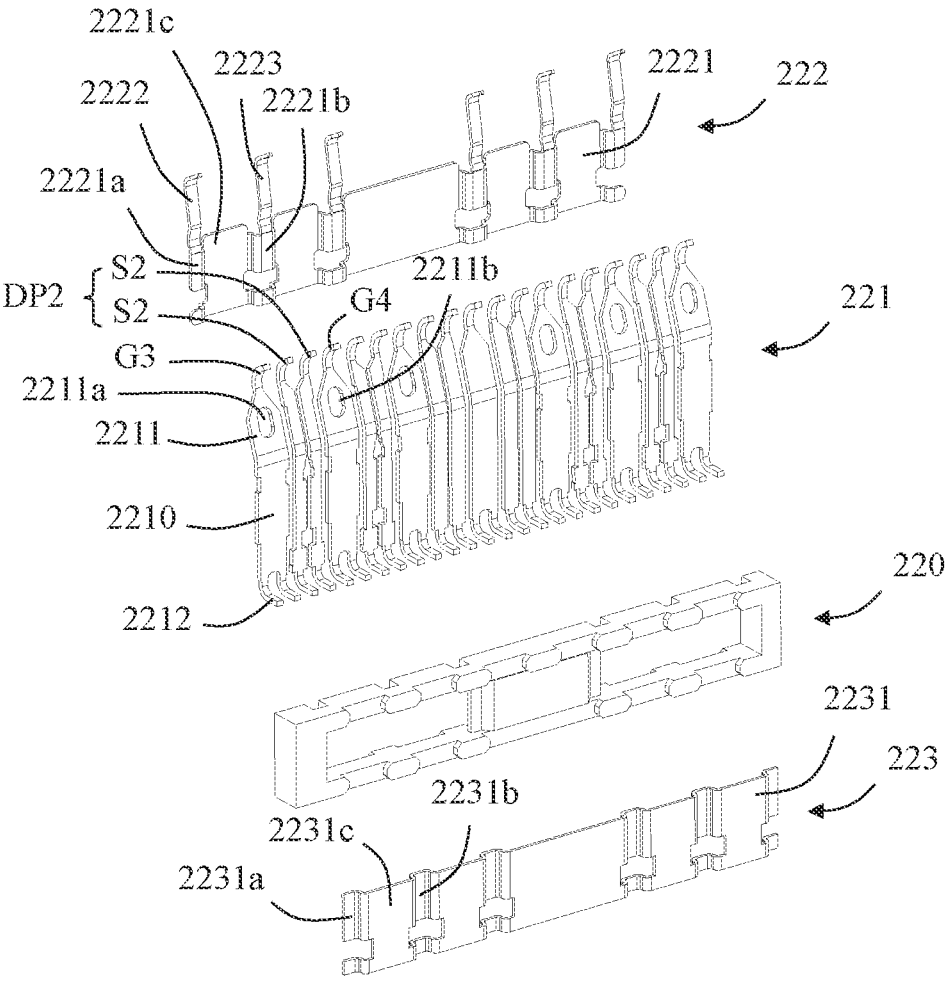
FIG. 19 is a perspective exploded view of a second terminal module in FIG. 11.
Figure 20:
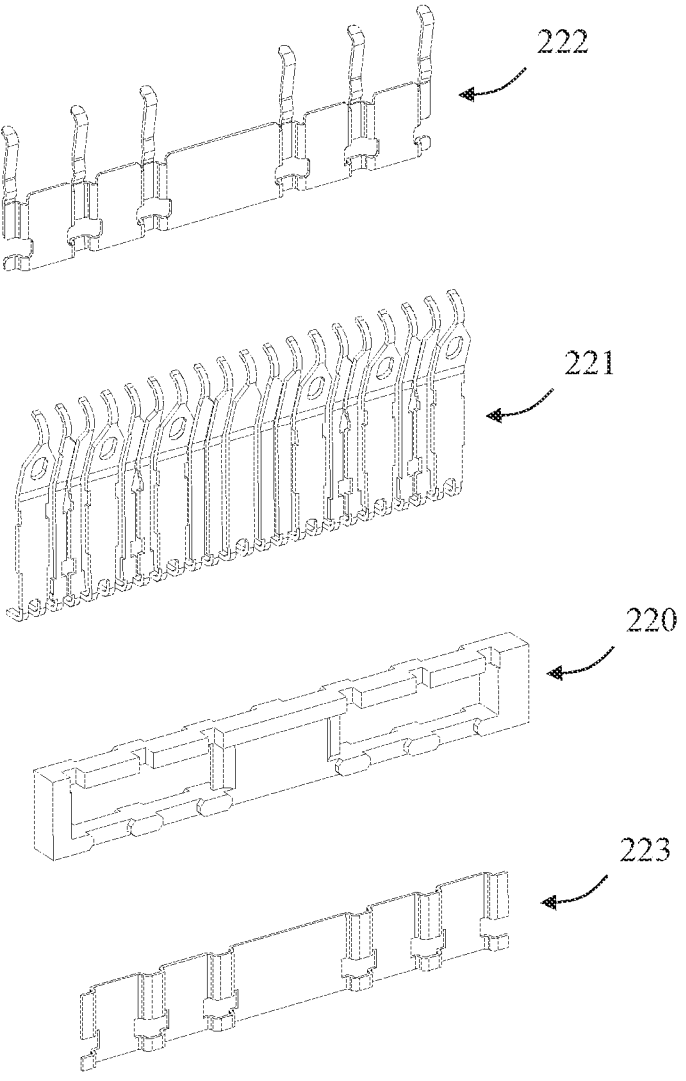
FIG. 20 is a perspective exploded view of FIG. 19 from another angle.

Referring to FIG. 19 and FIG. 20, the second terminal module 22 includes a second insulating block 220, a plurality of second conductive terminals 221 fixed to the second insulating block 220, a third ground sheet 222 fixed to one side of the second insulating block 220, and a fourth ground sheet 223 fixed to the other side of the second insulating block 220. In the illustrated embodiment of the present disclosure, the plurality of second conductive terminals 221 are insert-molded with the second insulating block 220. The third ground sheet 222 and the fourth ground sheet 223 are assembled to the second insulating block 220. The second insulating block 220 is installed and fixed to the bottom of the first mating slot 121. Of course, in other embodiment, the second conductive terminals 221, the third ground sheet 222 and the fourth ground sheet 223 may also be insert-molded with the second insulating block 220. Alternatively, the second conductive terminals 221, the third ground sheet 222 and the fourth ground sheet 223 may also be assembled and fixed to the second insulating block 220. Referring to FIG. 12, in the embodiment shown in the present disclosure, a side of the second insulating block 220 facing the first terminal module 21 defines a plurality of second grooves 2201 extending upwardly.

Each second conductive terminal 221 includes a second fixing portion 2210, a second elastic contact arm 2211 extending from one end of the second fixing portion 2210, and a second tail portion 2212 extending from the other end of the second fixing portion 2210. The second fixing portion 2210 is at least partially fixed to the second insulating block 220. The second tail portion 2212 extends out of the second insulating block 220. In the illustrated embodiment of the present disclosure, the plurality of second conductive terminals 221 include a plurality of pairs of second differential signal terminals DP2, a plurality of third ground terminals G3 and a plurality of fourth ground terminals G4. Two sides of each pair of second differential signal terminals DP2 is associated with one third ground terminal G3 and one fourth ground terminal G4, respectively. Each pair of second differential signal terminals DP2 includes two second signal terminals S2. A width of the third ground terminal G3 is generally larger than a width of each of the second signal terminals S2. A width of the fourth ground terminal G4 is generally greater than the width of each of the second signal terminals S2. With such configuration, the second terminal module 22 can better transmit high-speed signals, reduce external interference, and improve signal transmission quality. In the illustrated embodiment of the present disclosure, the second elastic contact arm 2211 of the third ground terminal G3 defines a third through hole 2211a. The second elastic contact arm 2211 of the fourth ground terminal G4 defines a fourth through hole 2211b.

The third ground sheet 222 includes a third base portion 2221, a plurality of third grounding elastic arms 2222 extending integrally from the third base portion 2221, and a plurality of fourth grounding elastic arms 2223 integrally extending from the third base portion 2221. The third base portion 2221 includes a fifth contact portion 2221a in contact with the second fixing portion 2210 of the third ground terminal G3, a sixth contact portion 2221b in contact with the second fixing portion 2210 of the fourth ground terminal G4, and a third raised portion 2221c connecting the fifth contact portion 2221a and the sixth contact portion 2221b. By the fifth contact portion 2221a and the sixth contact portion 2221*b* being in contact with corresponding third ground terminal G3 and the fourth ground terminal G4, it is realized that all of the third ground terminals G3 and all of the fourth ground terminals G4 are connected in series, thereby improving the ground shielding effect. The third raised portion 2221*c* is configured to avoid the second differential signal terminals DP2, so as to avoid a short circuit due to contact with the second differential signal terminals DP2.

In the illustrated embodiment of the present disclosure, the third grounding elastic arm 2222 is inserted into the third through hole 2211*a* so as to contact with the second elastic contact arm 2211 of the third ground terminal G3. The fourth grounding elastic arm 2223 is inserted into the fourth through hole 2211*b* so as to contact with the second elastic contact arm 2211 of the fourth ground terminal G4.

The fourth ground sheet 223 includes a fourth base portion 2231. The fourth base portion 2231 includes a seventh contact portion 2231*a* in contact with the second fixing portion 2210 of the third ground terminal G3, an eighth contact portion 2231*b* in contact with the second fixing portion 2210 of the fourth ground terminal G4, and a fourth raised portion 2231*c* connecting the seventh contact portion 2231*a* and the eighth contact portion 2231*b*. By the seventh contact portion 2231*a* and the eighth contact portion 2231*b* being in contact with the corresponding third ground terminal G3 and the fourth ground terminal G4, the grounding area is increased, thereby further improving the ground shielding effect. The fourth raised portion 2231*c* is configured to avoid the second differential signal terminals DP2, so as to avoid a short circuit due to contact with the second differential signal terminals DP2.

It is understandable to those skilled in the art that in the embodiment shown in the present disclosure, the third base portion 2221 of the third ground sheet 222 and the fourth base portion 2231 of the fourth ground sheet 223 are symmetrically disposed on two sides of the second conductive terminals 221, respectively. As far as the second fixing portion 2210 of the third ground terminal G3 is concerned, two sides of the second fixing portion 2210 of the third ground terminal G3 are in contact with the fifth contact portion 2221*a* of the third ground sheet 222 and the seventh contact portion 2231*a* of the fourth ground sheet 223, respectively. As far as the second fixing portion 2210 of the fourth ground terminal G4 is concerned, two sides of the second fixing portion 2210 of the fourth ground terminal G4 are in contact with the sixth contact portion 2221*b* of the third ground sheet 222 and the eighth contact portion 2231*b* of the fourth ground sheet 223, respectively. As shown in FIG. 21 and FIG. 22, each pair of second differential signal terminals DP2 is circumferentially surrounded by a second annular shielding cavity 224 which is formed by the third ground terminal G3, the fourth ground terminal G4, the third ground sheet 222 and the fourth ground sheet 223, thereby greatly reducing the distortion during signal transmission.

Referring to FIG. 10 and FIG. 11, the first connection block 23 includes a middle portion 231, a plurality of first convex ribs 232 protruding from the middle portion 231 to one side, a plurality of second convex ribs 233 protruding from the middle portion 231 to the other side. The first convex ribs 232 are configured for being inserted into the first grooves 2101 of the first insulating block 210. The second convex ribs 233 are configured for being inserted into the second grooves 2201 of the second insulating block 220.

In the illustrated embodiment of the present disclosure, the first elastic contact arms 2111 and the second elastic contact arms 2211 extend into the first mating slot 121. The first elastic contact arms 2111 and the second elastic contact arms 2211 are located on two sides of the first mating slot 121, respectively. The first elastic contact arms 2111 protrude toward the second elastic contact arms 2211. The second elastic contact arms 2211 protrude toward the first elastic contact arms 2111. In such a configuration, the first elastic contact arms 2111 and the second elastic contact arms 2211 can jointly clamp a tongue plate of a first mating connector, so as to improve mating reliability.

The first tail portions 2112 are configured to be fixed to the first row of conductive pads 2031 by soldering or welding. The second tail portions 2212 are configured to be fixed to the second row of conductive pads 2032 by soldering or welding. In the illustrated embodiment of the present disclosure, the first tail portions 2112 are soldered or welded to the first row of conductive pads 2031 through SMT. The second tail portions 2212 are soldered or welded to the second row of conductive pads 2032 through SMT.

In the illustrated embodiment of the present disclosure, the third terminal module 24 is the same as the first terminal module 21; the fourth terminal module 25 is the same as the second terminal module 22; and the second connection block 26 is the same as the first connection block 23, which will not be repeated in the present disclosure.

The plurality of conductive terminals 2 include the plurality of first conductive terminals 211 and the plurality of second conductive terminals 221. The elastic contact arms include the first elastic contact arms 2111 and the second elastic contact arms 2211.

Referring to FIG. 1 to FIG. 5 and FIG. 23 to FIG. 32, in the embodiment shown in the present disclosure, the metal shielding cage 20 includes a first metal shell 3, a second metal shell 4 snapped together with the first metal shell 3, and an installation shell 5 fixed to the first metal shell 3.

Figure 23:
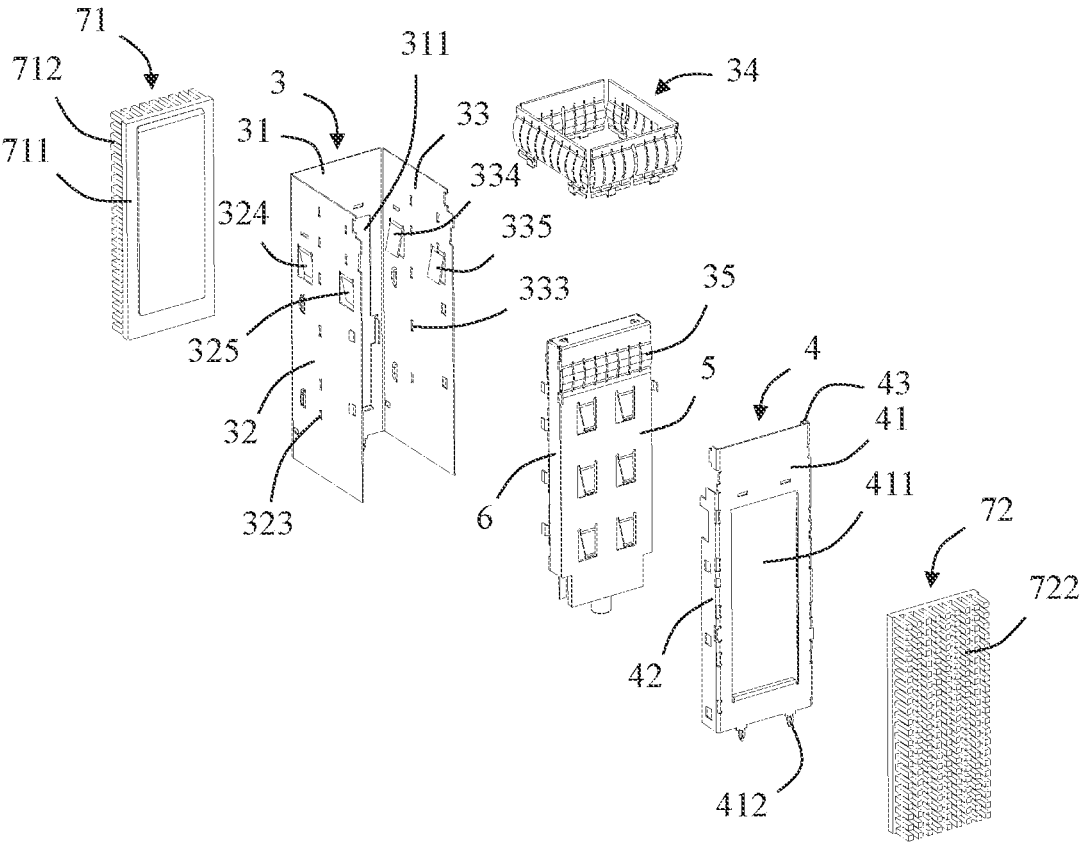
FIG. 23 is a partial perspective exploded view of a metal shielding cage in FIG. 3.
Figure 24:
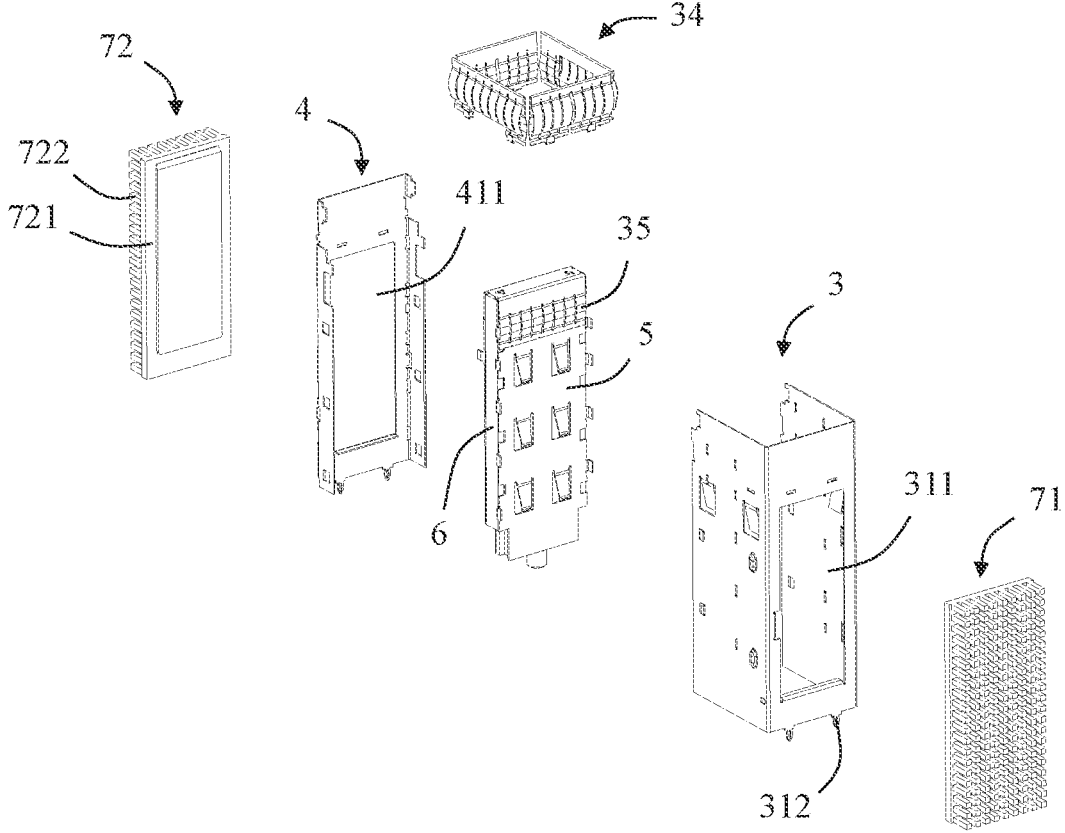
FIG. 24 is a partial perspective exploded view of FIG. 23 from another angle.
Figure 25:
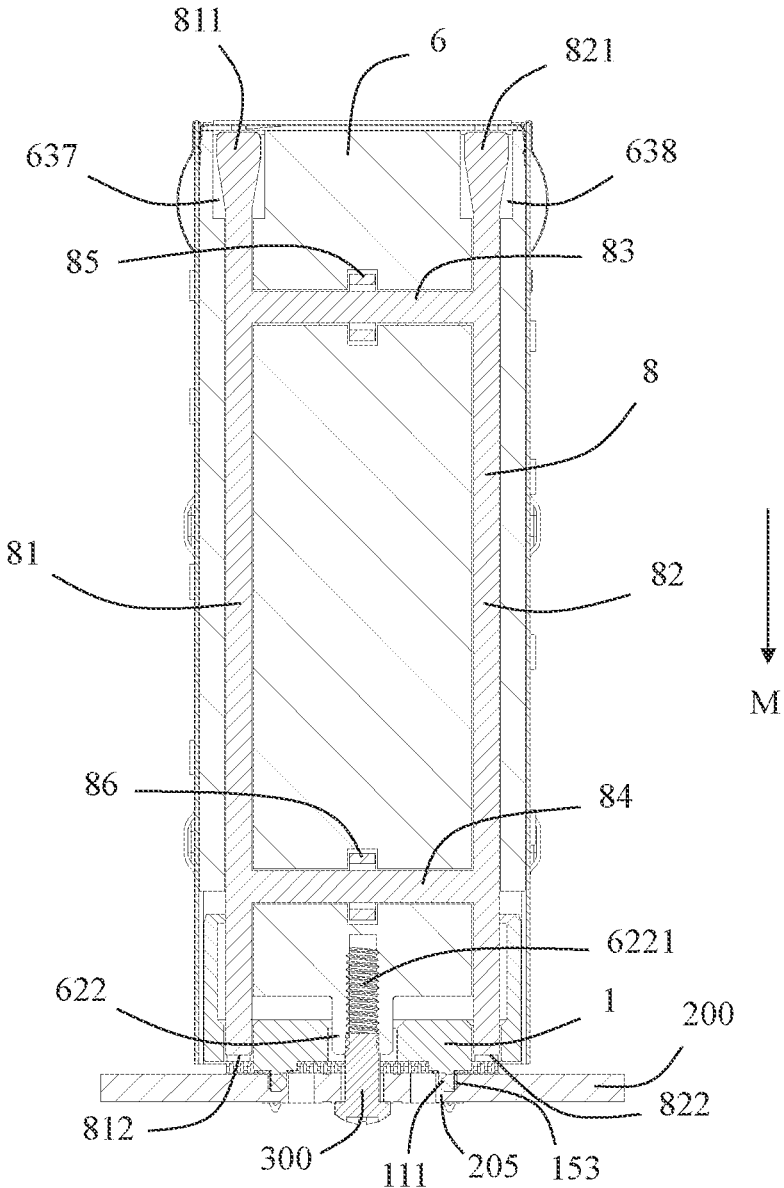
FIG. 25 is a schematic cross-sectional view taken along line D-D in FIG. 5.

Referring to FIG. 23 and FIG. 24, in the embodiment shown in the present disclosure, the first metal shell 3 is roughly U-shaped, which includes a first end wall 31, a first side wall 32 bent vertically from one end of the first end wall 31, and a second side wall 33 is vertically bent from the other end of the first end wall 31. The first side wall 32 is substantially parallel to the second side wall 33. The first end wall 31 defines a first opening 311.

The second metal shell 4 is also roughly U-shaped, which includes a second end wall 41, a first fastening wall 42 vertically bent from one end of the second end wall 41, and a second fastening wall 43 is vertically bent from the other end of the second end wall 41. The second end wall 41 defines a second opening 411. In the illustrated embodiment of the present disclosure, the second metal shell 4 and the first metal shell 3 have an asymmetric structure.

In an embodiment of the present disclosure, a bottom of the second end wall 41 is not in contact with the circuit board 200. Such arrangement is beneficial to the wiring of the circuit board 200 and reduces the risk of short circuit. Even, a gap formed between the second end wall 41 and the circuit board 200 can provide a space for electronic components on the circuit board 200.

In another embodiment of the present disclosure, the bottom of the second end wall 41 is in contact with the circuit board 200, for example, it is in contact with a ground path on the circuit board 200. Such arrangement is beneficial to improve the grounding effect between the second end wall 41 and the circuit board 200.

During assembly, the first fastening wall 42 is buckled and fixed to the first side wall 32; and the second fastening wall 43 is buckled and fixed to the second side wall 33.

After assembly, the first end wall 31, the first side wall 32, the second side wall 33 and the second end wall 41 together define the receiving cavity 30. In the illustrated embodiment of the present disclosure, the metal shielding cage 20 is in an elevated vertical shape. Specifically, the first end wall 31, the first side wall 32, and the second side wall 33 all have a same first height along the first direction A1-A1. Both the first side wall 32 and the second side wall 33 have a same first length along the second direction A2-A2. Both the first end wall 31 and the second end wall 41 have a same first width along the third direction A3-A3. In the illustrated embodiment of the present disclosure, the first height is greater than the first length, and the first height is greater than the first width. The first length is greater than the first width. In an illustrated embodiment of the present disclosure, the first height is greater than at least twice the first length.

The metal shielding cage 20 of the present disclosure is in an elevated vertical shape, in which the first height is greater than the first length, and the first height is greater than the first width. Compared with the arrangement of the metal shielding cage parallel to the circuit board in the prior art, the arrangement of the present disclosure is beneficial to save the occupied area of the circuit board 200. Under the same conditions, the arrangement of the present disclosure is beneficial to enable the circuit board 200 to arrange more electronic components. At the same time, the metal shielding cage 20 of the present disclosure is prone to the risk of tilting under the action of external force due to its high height.

The first metal shell 3 further includes a plurality of first fixing feet 312 protruding downwardly from a bottom edge of the first end wall 31 along the first direction A1-A1. The first side wall 32 defines a plurality of first assembly holes 323. The second side wall 33 defines a plurality of second assembly holes 333. In the illustrated embodiment of the present disclosure, each first fixing foot 321 has a fish-eye shape, so that the first fixing foot 321 has a certain elastic deformation capability. The first fixing feet 321 are configured to be pressed into the first row of fixing holes 2061 of the circuit board 200, so as to be electrically connected to the circuit board 200 (such as grounding).

The second metal shell 4 further includes a plurality of second fixing feet 412 protruding downwardly from a bottom edge of the second end wall 41 along the first direction A1-A1. In the illustrated embodiment of the present disclosure, each second fixing foot 412 has a fish-eye shape, so that the second fixing foot 412 has a certain elastic deformation capability. The second fixing feet 412 are configured to be pressed into the second row of fixing holes 2062 of the circuit board 200, so as to be electrically connected to the circuit board 200 (such as grounding).

Figure 26:
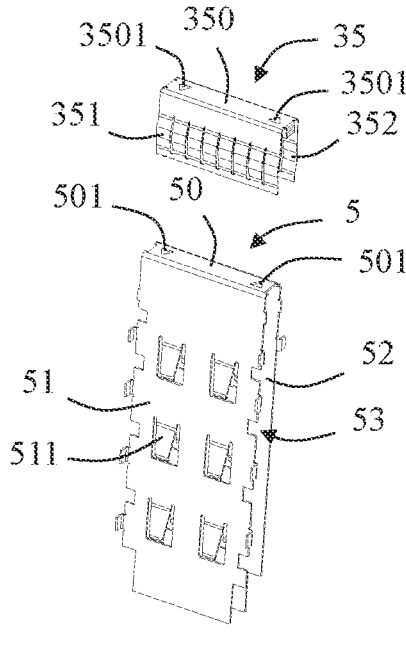
FIG. 26 is a partial perspective exploded view of a second grounding elastic arm, an installation shell, an installation block, a light guide element and the electrical connector.
Figure 26:
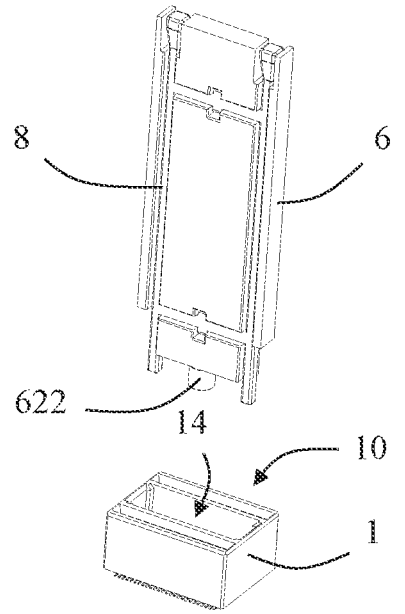
Figure 27:
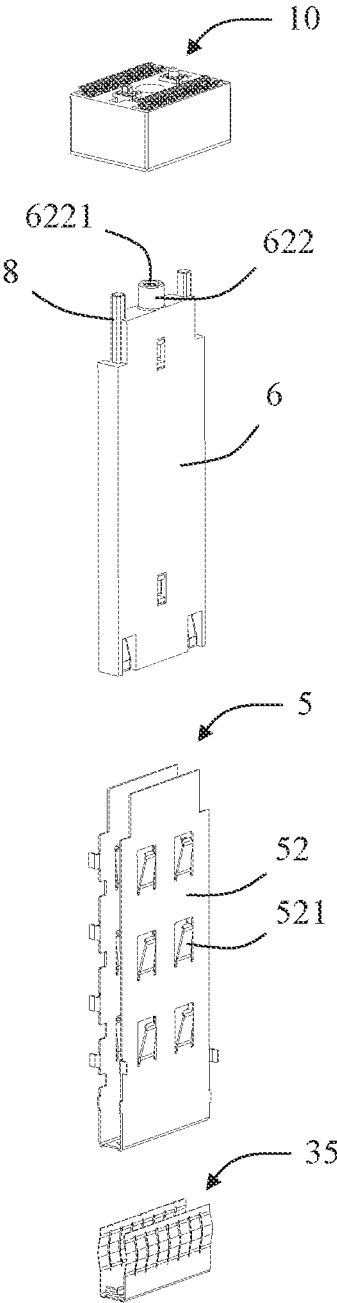
FIG. 27 is a partial perspective exploded view of FIG. 26 from another angle.
Figure 28:
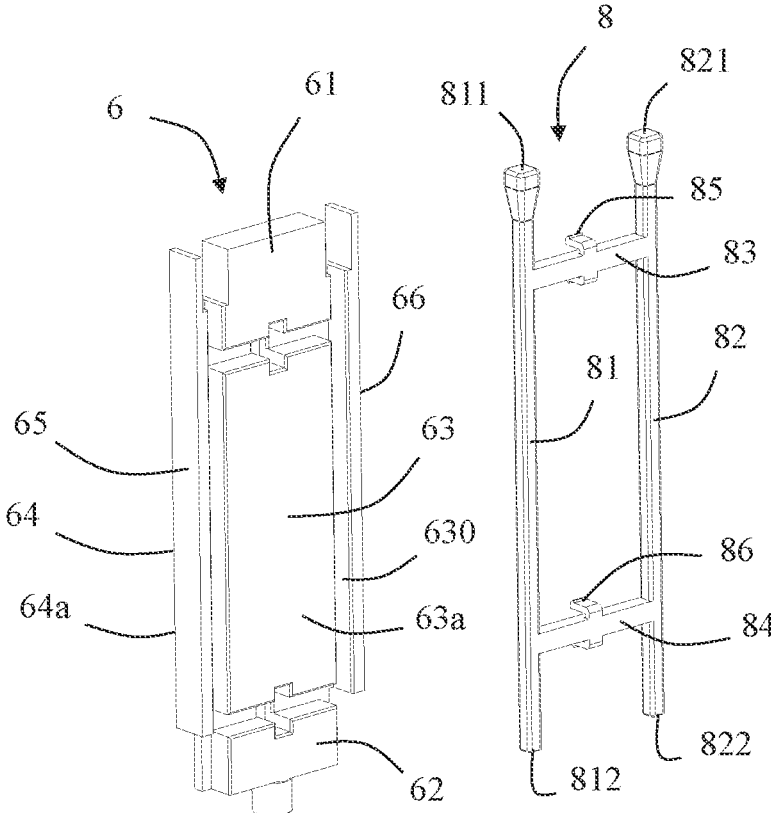
FIG. 28 is a perspective exploded view of the installation block and the light guide element in FIG. 26.
Figure 29:
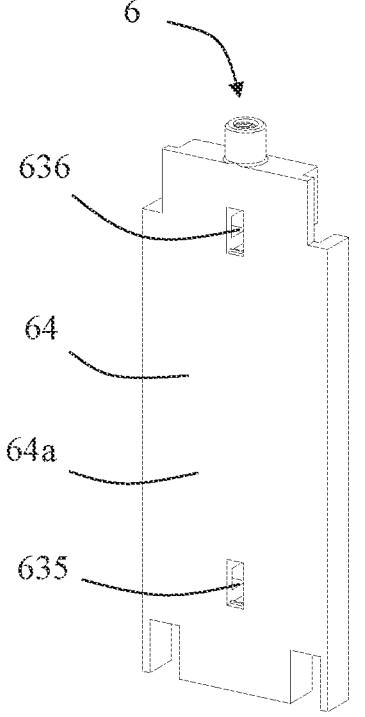
FIG. 29 is a perspective exploded view of FIG. 28 from another angle.
Figure 29:
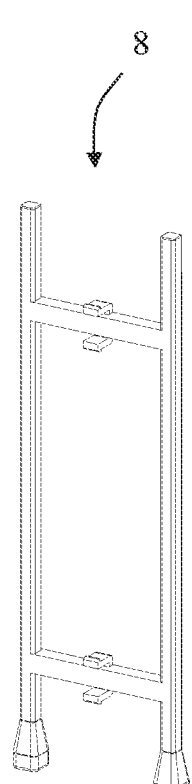
Figure 30:
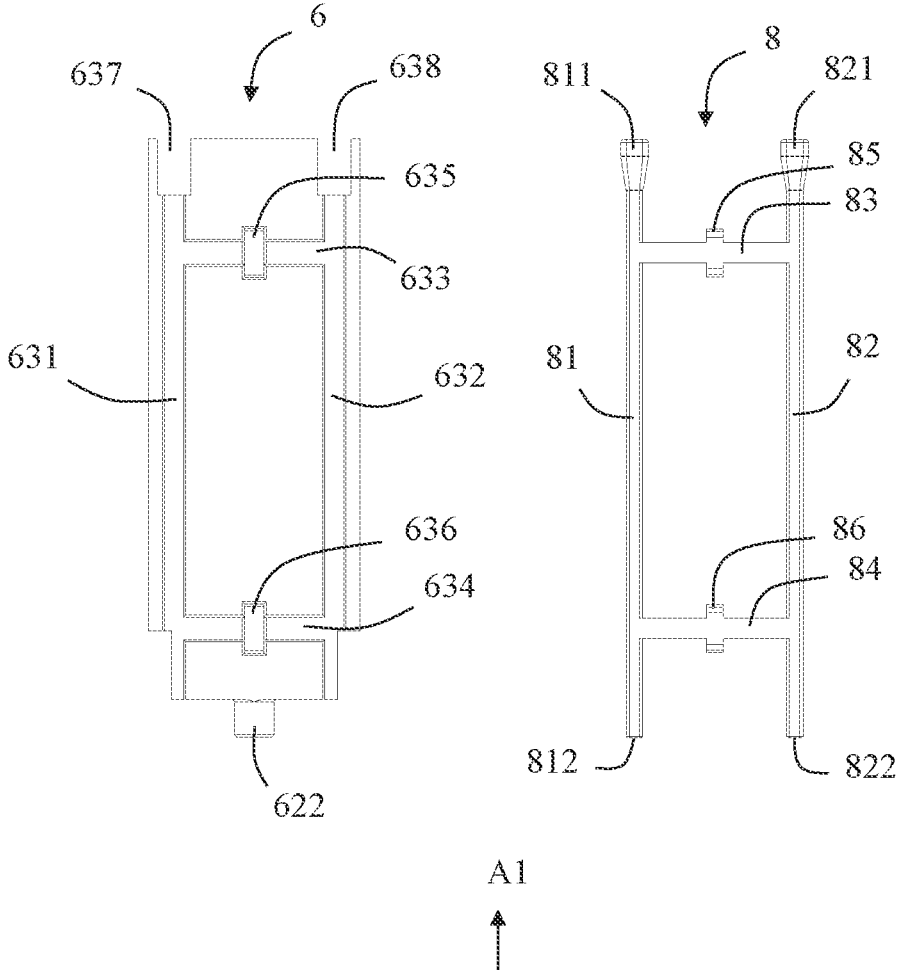
FIG. 30 is a front view of FIG. 28.
Figure 31:
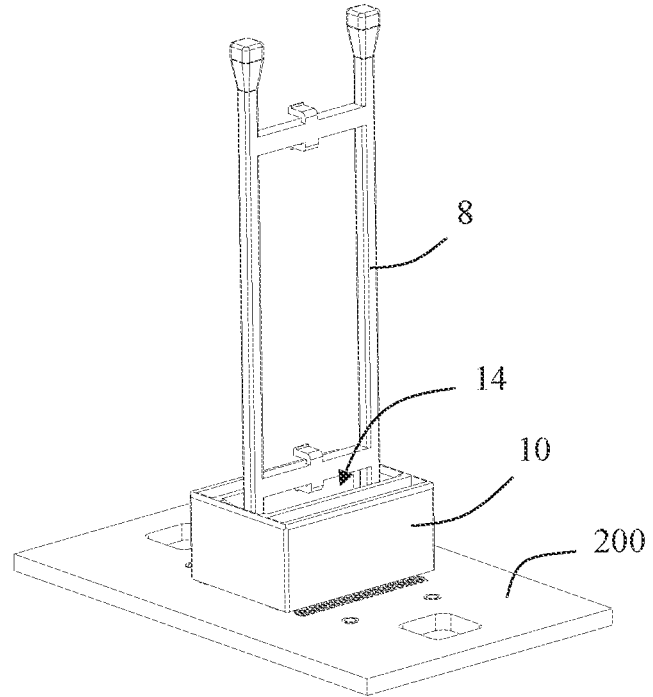
FIG. 31 is a perspective schematic view of a mutual positional relationship between the light guide element, the electrical connector and the circuit board when they are assembled together.
Figure 32:
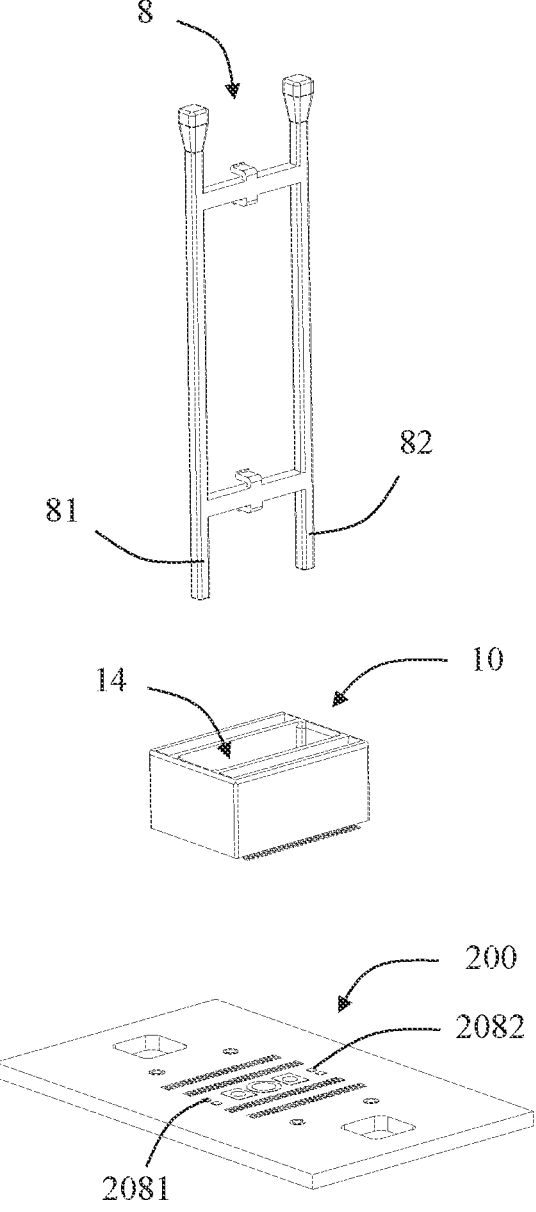
FIG. 32 is a partially exploded perspective view of FIG. 31.

Referring to FIG. 26 and FIG. 27, the installation shell 5 is roughly U-shaped, which includes a top wall 50, a first fixing wall 51 bent downwardly from one end of the top wall 50, and a second fixing wall 52 bent downward from the other end of the top wall 50. In the illustrated embodiment of the present disclosure, the top wall 50 defines a plurality of first through holes 501. Two sides of the first fixing wall 51 are fixed to the first side wall 32 and the second side wall 33, respectively. Two sides of the second fixing wall 52 are fixed to the first side wall 32 and the second side wall 33, respectively.

Referring to FIG. 1, the installation shell 5 divides the receiving cavity 30 into a first receiving cavity 301 and a second receiving cavity 302 which are located on two sides of the installation shell 5, respectively. The first receiving cavity 301 communicates with the first mating slot 121 to jointly receive the first mating connector. Similarly, the second receiving cavity 302 communicates with the second mating slot 122 to jointly receive the second mating connector.

In the illustrated embodiment of the present disclosure, the first side wall 32 includes a first elastic arm 324 protruding into the first receiving cavity 301. The second side wall 33 includes a second elastic arm 334 protruding into the first receiving cavity 301. The first fixing wall 51 includes a third elastic arm 511 protruding into the first receiving cavity 301. The first elastic arm 324, the second elastic arm 334 and the third elastic arm 511 are configured to abut against the first mating connector. In this way, on the one hand, the first elastic arm 324, the second elastic arm 334, and the third elastic arm 511 can increase the insertion and extraction force when the first mating connector is mated, thereby improving the mating reliability; on the other hand, the first elastic arm 324, the second elastic arm 334 and the third elastic arm 511 are also beneficial to transfer the heat generated when the first mating connector is working to the metal shielding cage 20.

Similarly, the first side wall 32 includes a fourth elastic arm 325 protruding into the second receiving cavity 302. The second side wall 33 includes a fifth elastic arm 335 protruding into the second receiving cavity 302. The second fixing wall 52 includes a sixth elastic arm 521 protruding into the second receiving cavity 302. The fourth elastic arm 325, the fifth elastic arm 335 and the sixth elastic arm 521 are configured to abut against the second mating connector. In this way, on the one hand, the fourth elastic arm 325, the fifth elastic arm 335 and the sixth elastic arm 521 can increase the insertion and extraction force when the second mating connector is mated, thereby improving the mating reliability; and on the other hand, the fourth elastic arm 325, the fifth elastic arm 335 and the sixth elastic arm 521 are also beneficial to transfer the heat generated when the second mating connector is in working to the metal shielding cage 20.

Referring to FIG. 1 to FIG. 5, FIG. 23 and FIG. 24, in the embodiment shown in the present disclosure, in order to improve the grounding effect with the mating connector, the metal shielding cage 20 further includes a plurality of first grounding elastic springs 34 fixed to the top of the first end wall 31, the top of the first side wall 32, the top of the second side wall 33 and the top of the second end wall 41. Each first grounding elastic spring 34 includes a first elastic arm 341 protruding into the receiving cavity 30 and a second elastic arm 342 located outside the metal shielding cage 20. Of course, in other embodiment, the first grounding elastic springs 34 of the metal shielding cage 20 may also be omitted.

The metal shielding cage 20 further includes a second grounding elastic spring 35 fixed to the installation shell 5. In the illustrated embodiment of the present disclosure, the second grounding elastic spring 35 is roughly U-shaped, which includes a top end wall 350, a third elastic arm 351 bent downwardly from one end of the top end wall 350, and a fourth elastic arm 352 bent downwardly from the other end of the top end wall 350. The top end wall 350 leans against the top wall 50. The top end wall 350 defines a plurality of second through holes 3501 aligned with the plurality of first through holes 501. The third elastic arm 351 is located outside the first fixing wall 51 and protrudes into the first receiving cavity 301. The fourth elastic arm 352 is located outside the second fixing wall 52 and protrudes into the second receiving cavity 302. The third elastic arm 351 is configured to abut against the first mating connector. The fourth elastic arm 352 is configured to abut against the second mating connector. Of course, in other embodiment, the second grounding elastic spring 35 of the metal shielding cage 20 may also be omitted.

Referring to FIG. 26 to FIG. 30, in the embodiment illustrated in the present disclosure, the installation shell 5 further includes a U-shaped opening 53 formed by the top wall 50, the first fixing wall 51 and the second fixing wall 52. The connector assembly 100 further includes an installation block 6 installed in the opening 53. The shape and size of the installation block 6 match the opening 53. In the illustrated embodiment of the present disclosure, the bottom of the installation shell 5 and the bottom of the installation block 6 are at least partially inserted into the receiving slot 14 of the insulating body 1 to provide a certain degree of positioning.

The installation block 6 includes a top wall portion 61, a bottom wall portion 62, a first wall portion 63, a second wall portion 64 opposite to the first wall portion 63, a third wall portion 65 connecting one end of the first wall portion 63 and one end of the second wall portion 64, and a fourth wall portion 66 connecting the other end of the first wall portion 63 and the other end of the second wall portion 64. The bottom wall portion 62 has a bottom surface 621 and an installation post 622 protruding downwardly from the bottom surface 621. The installation post 622 defines an internal threaded hole 6221. In one embodiment of the present disclosure, the installation block 6 is a metal block made of metal material or an insulating block made of insulating material. The top wall portion 61 of the installation block 6 abuts against the bottom of the top wall 50 of the installation shell 5.

The first wall portion 63 includes a first wall surface 63a. The second wall portion 64 includes a second wall surface 64a opposite to the first wall surface 63a. The installation block 6 further includes an installation groove 630 recessed from the first wall surface 63a toward the second wall surface 64a. In the illustrated embodiment of the present disclosure, the installation groove 630 includes a first installation groove 631, a second installation groove 632 parallel to the first installation groove 631, a first connecting groove 633 connecting the first installation groove 631 and the second installation groove 632 and located on an upper portion of the installation block 6, and a second connecting groove 634 connecting the first installing groove 631 and the second installing groove 632 and located at a lower portion of the installing block 6. In the illustrated embodiment of the present disclosure, the first installation groove 631 and the second installation groove 632 extend along the first direction A1-A1. The first connecting groove 633 and the second connecting groove 634 extend along the third direction A3-A3. The installation block 6 further includes a first fixing groove 635 located in a middle of the first connecting groove 633 and extending through the first wall surface 63a and the second wall surface 64a along the second direction A2-A2. The first fixing groove 635 communicates with the first connecting groove 633. The installation block 6 further includes a second fixing groove 636 located in a middle of the second connecting groove 634 and extending through the first wall surface 63a and the second wall surface 64a along the second direction A2-A2. The second fixing groove 636 communicates with the second connecting groove 634. The installation block 6 further includes a first enlarged groove 637 and a second enlarged groove 638 which extend upwardly through the top wall portion 61 along the first direction A1-A1. The first enlarged groove 637 communicates with the top of the first installation groove 631. The second enlarged groove 638 communicates with the top of the second installation groove 632.

In the illustrated embodiment of the present disclosure, the installation post 622 is inserted into the mounting hole 1411 of the insulating body 1. The fastener 300 passes through the installation through hole 204 from the other side of the circuit board 200 and is fixed in the installation post 622. In the illustrated embodiment of the present disclosure, the fastener 300 is a bolt. An external thread of the bolt mates with the internal thread hole 6221 of the installation post 622, so as to lock the installation block 6 to the circuit board 200. Of course, it is understandable to those skilled in the art that the fastener 300 can also be in other forms, which will not be repeated in the present disclosure. In the illustrated embodiment of the present disclosure, when the installation block 6 is made of metal material, its structural strength is better, which is beneficial to improve the mounting reliability with the circuit board 200 through the fastener 300. The installation block 6 can not only provide heat dissipation, but also provide better support for the elevated metal shielding cage 20 of the present disclosure, reducing the risk of the metal shielding cage 20 tilting due to external force while performing the heat dissipation function. In addition, the installation block 6 made of metal material can better separate the first receiving cavity 301 from the second receiving cavity 302, which is beneficial to improve the shielding effect and improve the quality of data transmission.

Of course, it is understandable to those skilled in the art that the installation block 6 may not be provided with the installation post 622. At this time, the internal threaded hole 6221 may be formed in the bottom wall 141. Through the cooperation of the fastener 300 and the internal threaded hole 6221, the purpose of fastening the installation block 6 to the circuit board 200 can also be achieved.

It is understandable to those skilled in the art that in the present disclosure, the fastener 300 can also be directly fastened to the electrical connector 10 through the installation through hole 204 of the circuit board 200, so as to achieve the purpose of locking the electrical connector 10 to the circuit board 200. In one embodiment of the present disclosure, the fastener 300 is directly fastened to the insulating body 1 through the installation through hole 204 of the circuit board 200. At this time, the insulating body 1 may be provided with an internal threaded hole. The fastener 300 is a bolt and is fastened in the internal threaded hole of the insulating body 1. It is understandable to those skilled in the art that the fastener 300 can also be in other forms, which will not be repeated in the present disclosure. In addition, in this embodiment, the connector assembly 100 may not be provided with the installation block 6.

In the illustrated embodiment of the present disclosure, the connector assembly 100 further includes a plurality of heat sinks mounted to the metal shielding cage 20. In the illustrated embodiment of the present disclosure, the heat sinks include a first heat sink 71 fixed to the first end wall 31 and a second heat sink 72 fixed to the second end wall 41.

In one embodiment of the present disclosure, the first heat sink 71 includes a first body portion 711 and a plurality of first heat dissipation fins 712 of the first body portion 711 protruding to one side. In one embodiment of the present disclosure, the first body portion 711 is fixed to an outer side of the first end wall 31. The plurality of first heat dissipation fins 712 protrude outward beyond the first end wall 31. The plurality of first heat dissipation fins 712 are arranged in a matrix and includes a plurality of first heat dissipation channels disposed in parallel along the first direction A1-A1 and along the third direction A3-A3. In the illustrated embodiment of the present disclosure, the first body portion 711 is fixed to the outer side of the first end wall 31 by soldering or welding. The first body portion 711 at least partially extends inwardly into the first opening 311 and is exposed in the first receiving cavity 301. The first body portion 711 is configured to be in contact with the first mating connector, so as to achieve better heat dissipation for the first mating connector. The first heat dissipation through hole 2071 of the circuit board 200 communicates with the first heat dissipation channels which are disposed along the first direction A1-A1 in the first direction A1-A1 to facilitate heat dissipation.

Similarly, in an embodiment of the present disclosure, the second heat sink 72 includes a second body portion 721 and a plurality of second heat dissipation fins 722 of the second body portion 721 protruding to another side. In an embodiment of the present disclosure, the second body portion 721 is fixed to an outer side of the second end wall 41. The plurality of second heat dissipation fins 722 protrude outwardly beyond the second end wall 41. The plurality of second heat dissipation fins 722 are arranged in a matrix and includes a plurality of second heat dissipation channels arranged in parallel along the first direction A1-A1 and along the third direction A3-A3. In the illustrated embodiment of the present disclosure, the second body portion 721 is fixed to the outer side of the second end wall 41 by soldering or welding. The second body portion 721 at least partially extends inwardly into the second opening 411 and is exposed in the second receiving cavity 302. The second body portion 721 is configured to be in contact with the second mating connector, so as to achieve better heat dissipation for the second mating connector. The second heat dissipation through hole 2072 of the circuit board 200 communicates with the second heat dissipation channels which are disposed along the first direction A1-A1 in the first direction A1-A1 to facilitate heat dissipation. Referring to FIG. 1, in the first embodiment illustrated in the present disclosure, both the first heat sink 71 and the second heat sink 72 are spaced a certain distance from the circuit board 200 along the first direction A1-A1 so as to facilitate air circulation.

The connector assembly 100 further includes a light guide element 8. In the illustrated embodiment of the present disclosure, the light guide element 8 is installed in the installation block 6. The light guide element 8 includes a first light guide pipe 81, a second light guide pipe 82 parallel to the first light guide pipe 81, a first connecting pipe 83 connecting the first light pipe 81 and the second light pipe 82 and located at an upper portion of the light guide element 8, a second connecting pipe 84 connecting the first light guide pipe 81 and the second light guide pipe 82 and located at a lower portion of the light guide element 8, a first locking arm 85 connected to the middle of the first connecting pipe 83, and a second locking arm 86 connected to the middle of the second connecting pipe 84. The first light pipe 81 includes a first light guide head 811 at the top and a first end 812 at the bottom. The second light pipe 82 includes a second light guide head 821 at the top and a second end 822 at the bottom. In the illustrated embodiment of the present disclosure, a cross-sectional area of the first light guide head 811 is larger than a cross-sectional area of other portions of the first light guide pipe 81; and a cross-sectional area of the second light guide head 821 is larger than a cross-sectional area of other portions of the second light guide pipe 82, so as to facilitate light guiding and identification.

When assembled, the light guide element 8 is received in the installation groove 630. The first light pipe 81 is received in the first installation groove 631. The second light pipe 82 is received in the second installation groove 632. The first connecting pipe 83 is received in the first connecting groove 633. The first locking arm 85 is locked in the first fixing slot 635. The second connecting pipe 84 is received in the second connecting groove 634. The second locking arm 86 is locked in the second fixing slot 636. The first light guide head 811 is received in the first enlarged groove 637. The second light guide head 821 is received in the second enlarged groove 638.

In the illustrated embodiment of the present disclosure, both the first light pipe 81 and the second light pipe 82 extend along the mating direction M of the mating connector. The bottom of the first light pipe 81 and the bottom of the second light pipe 82 are inserted into the first installation through hole 1412a and the second installation through hole 1412b of the insulating body 1, respectively, along an insertion direction of the mating connector. The first end 812 of the first light pipe 81 and the second end 822 of the second light pipe 82 correspond to the first light emitting element 2081 and the second light emitting element 2082, respectively. Both the first light guide head 811 and the second light guide head 821 are exposed to the outside through the first through hole 501 and the second through hole 3501. When in use, the light emitted by the first light emitting element 2081 and the second light emitting element 2082 can be transmitted to the first light guide head 811 and the second light guide head 821 through the first light guide pipe 81 and the second light guide pipe 82, so as to be observed from the outside to serve as an indicator. It is understandable to those skilled in the art that the bottom of the first light pipe 81 and the bottom of the second light pipe 82 are located adjacent to the first light emitting element 2081 and the second light emitting element 2082, respectively. In the embodiment shown in the present disclosure, the bottom of the first light pipe 81 and the bottom of the second light pipe 82 are spaced apart from the first light emitting element 2081 and the second light emitting element 2082, respectively, so as to avoid damage to the first light emitting element 2081 and the second light emitting element 2082.

Compared with the prior art, the first light pipe 81 and the second light pipe 82 of the present disclosure both extend along the mating direction M of the mating connector. The first light pipe 81 and the second light pipe 82 are at least partially inserted into corresponding first installation through hole 1412a and the second installation through hole 1412b from the receiving slot 14 along the mating direction M. The first end 812 of the first light pipe 81 and the second end 822 of the second light pipe 82 face corresponding first light emitting element 2081 and the second light emitting element 2082, respectively. When the first light emitting element 2081 and the second light emitting element 2082 emit light, the light is transmitted to the first light guide head 811 and the second light guide head 821, so as to be observed from the outside to serve as an indicator. The design of inserting the first light pipe 81 and the second light pipe 82 into the insulating body 1 along the mating direction M in the present disclosure is beneficial to rationally utilize the inner space of the insulating body 1 to save space.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. A connector assembly configured to be mounted on a circuit board which is provided with a light emitting element, the connector assembly comprising:

an electrical connector comprising an insulating body and a plurality of conductive terminals; the insulating body comprising a mounting surface configured to be mounted to the circuit board, a mating slot configured to receive a mating connector along a mating direction, and an installation through hole extending through the mounting surface along the mating direction; each conductive terminal comprising an elastic contact arm protruding into the mating slot and a tail portion configured to be mounted to the circuit board;

a metal shielding cage shielding a periphery of the electrical connector; the metal shielding cage comprising a receiving cavity communicating with the mating slot; the receiving cavity and the mating slot being configured to accommodate the mating connector along the mating direction; the mating direction being perpendicular to the circuit board; and a light guide element comprising a light guide pipe which is at least partially inserted into the installation through hole along the mating direction; the light guide pipe comprising a light guide head located adjacent to a port of the receiving cavity and an end far away from the light guide head; the end being located adjacent to the light emitting element;

wherein the insulating body comprises a receiving groove located at a side of the mating slot;

the metal shielding cage comprises an installation block partially installed in the receiving groove; the installation block comprises an installation groove to receive the light guide element.

2. The connector assembly according to claim 1, wherein the installation groove comprises a fixing groove; the light guide element comprises a locking arm locked in the fixing groove.

3. The connector assembly according to claim 2, wherein the installation block comprises a first wall surface and a second wall surface opposite to the first wall surface; the installation groove is recessed from the first wall surface toward the second wall surface; the fixing groove extends through the first wall surface and the second wall surface.

4. The connector assembly according to claim 1, wherein the installation block comprises a bottom wall surface and an installation post protruding downwardly from the bottom wall surface; the installation post defines an internal threaded hole;

the insulating body comprises a bottom wall located at a bottom of the receiving groove; the bottom wall defines a mounting hole extending through the bottom wall along a first direction parallel to the mating direction; the installation post is at least partially inserted into the mounting hole;

the connector assembly further comprises a fastener passing through the circuit board to be fixed in the internal threaded hole.

5. The connector assembly according to claim 1, wherein the metal shielding cage comprises a first end wall, a first side wall, a second side wall opposite to the first side wall, and a second end wall opposite to the first end wall; the receiving cavity is jointly enclosed by the first end wall, the first side wall, the second side wall and the second end wall.

6. The connector assembly according to claim 5, wherein the metal shielding cage comprises a first metal shell and a second metal shell; the first metal shell and the second metal shell are manufactured separately and fastened with each other;

the first metal shell comprises the first end wall, the first side wall and the second side wall; the first side wall is vertically bent from one end of the first end wall; and the second side wall is vertically bent from another end of the first end wall;

the second metal shell comprises the second end wall, a first fastening wall vertically bent from one end of the second end wall, and a second fastening wall bent vertically from another end of the second end wall; the first fastening wall is buckled and fixed to the first side wall; the second fastening wall is buckled and fixed to the second side wall.

7. The connector assembly according to claim 6, wherein the metal shielding cage comprises an installation shell fixed to the first metal shell; the installation shell divides the receiving cavity into a first receiving cavity and a second receiving cavity which are located on two sides of the installation shell, respectively;

the mating connector comprises a first mating connector configured to be accommodated in the first receiving cavity and a second mating connector configured to be accommodated in the second receiving cavity.

8. The connector assembly according to claim 7, wherein the installation shell comprises a top wall, a first fixing wall bent downwardly from one end of the top wall, a second fixing wall bent downward from another end of the top wall, and an opening surrounded by the top wall, the first fixing wall and the second fixing wall; the installation block is installed in the opening.

9. The connector assembly according to claim 8, wherein the top wall defines a first through hole;

the metal shielding cage comprises a second grounding elastic spring fixed to the installation shell; the second grounding elastic spring comprises a top end wall abutting against the top wall; the top end wall defines a second through hole at least partially aligned with the first through hole along the mating direction;

the light guide head is exposed to an outside of the connector assembly through the first through hole and the second through hole.

10. The connector assembly according to claim 7, wherein the first end wall defines a first opening communicating with the first receiving cavity; the second end wall defines a second opening communicating with the second receiving cavity;

the connector assembly further comprises a first heat sink fixed to the first end wall and a second heat sink fixed to the second end wall;

the first heat sink comprises a first body portion and a plurality of first heat dissipation fins protruding from the first body portion to one side; the first body portion at least partially extends inwardly into the first opening so as to be exposed in the first receiving cavity;

the second heat sink comprises a second body portion and a plurality of second heat dissipation fins protruding from the second body portion to another side; the second body portion at least partially extends inward into the second opening so as to be exposed in the second receiving cavity.

11. The connector assembly according to claim 1, wherein the light guide element comprises a first light guide pipe, a second light guide pipe parallel to the first light guide pipe, a first connecting pipe connecting the first light guide pipe and the second light guide pipe and located on an upper portion of the light guide element, a second connecting pipe connecting the first light guide pipe and the second light guide pipe and located at a lower portion of the light guide element, a first locking arm connected to a middle of the first connecting pipe, and a second locking arm connected to a middle of the second connecting pipe; the first light guide pipe comprises a first light guide head at the top and a first end at the bottom; the second light guide pipe comprises a second light guide head at the top and a second end at the bottom;

the light guide pipe comprises the first light guide pipe and the second light guide pipe; the light guide head comprises the first light guide head and the second light guide head; the end comprises the first end and the second end.

12. A connector assembly configured to be mounted on a circuit board which is provided with a light emitting element, the connector assembly comprising:

an electrical connector comprising an insulating body and a plurality of conductive terminals; the insulating body comprising a mounting surface, a mating slot configured to receive a mating connector along a mating direction, and an installation through hole extending through the mounting surface along the mating direction; each conductive terminal comprising an elastic contact arm protruding into the mating slot;

a metal shielding cage enclosing the electrical connector; the metal shielding cage comprising a receiving cavity communicating with the mating slot; the receiving cavity and the mating slot being configured to jointly accommodate the mating connector along the mating direction; the mating direction being perpendicular to the circuit board; and a light guide element comprising a light guide pipe which is at least partially inserted into the installation through hole along the mating direction; the light guide pipe comprising a light guide head located adjacent to a port of the receiving cavity and an end disposed facing the light emitting element along the mating direction;

wherein the insulating body comprises a receiving groove located at a side of the mating slot;

the metal shielding cage comprises an installation block partially installed in the receiving groove; the installation block comprises an installation groove to receive the light guide element.

13. The connector assembly according to claim 12, wherein the light guide element comprises a first light guide pipe, a second light guide pipe parallel to the first light guide pipe, a first connecting pipe connecting the first light guide pipe and the second light guide pipe and located on an upper portion of the light guide element, a second connecting pipe connecting the first light guide pipe and the second light guide pipe and located at a lower portion of the light guide element, a first locking arm connected to a middle of the first connecting pipe, and a second locking arm connected to a middle of the second connecting pipe; the first light guide pipe comprises a first light guide head at the top and a first end at the bottom; the second light guide pipe comprises a second light guide head at the top and a second end at the bottom;

the light guide pipe comprises the first light guide pipe and the second light guide pipe; the light guide head comprises the first light guide head and the second light guide head; the end comprises the first end and the second end.

14. A connector assembly configured to be mounted on a circuit board which is provided with a light emitting element, the connector assembly comprising:

an electrical connector comprising an insulating body and a plurality of conductive terminals; the insulating body comprising a mounting surface configured to be mounted to the circuit board, a mating slot configured to receive a mating connector along a mating direction, and an installation through hole extending through the mounting surface along the mating direction; each conductive terminal comprising an elastic contact arm protruding into the mating slot and a tail portion configured to be mounted to the circuit board;

a metal shielding cage shielding a periphery of the electrical connector; the metal shielding cage comprising a receiving cavity communicating with the mating slot; the receiving cavity and the mating slot being configured to accommodate the mating connector along the mating direction; the mating direction being perpendicular to the circuit board; and a light guide element comprising a light guide pipe which is at least partially inserted into the installation through hole along the mating direction; the light guide pipe comprising a light guide head located adjacent to a port of the receiving cavity and an end far away from the light guide head; the end being located adjacent to the light emitting element;

wherein the electrical connector comprises a first terminal module; the first terminal module comprises a first insulating block, a plurality of first conductive terminals fixed to the first insulating block, a first ground sheet fixed to one side of the first insulating block, and a second ground sheet fixed to another side of the first insulating block; the plurality of conductive terminals comprise the plurality of first conductive terminals;

each first conductive terminal comprises a first fixing portion, a first elastic contact arm extending from one end of the first fixing portion, and a first tail portion extending from another end of the first fixing portion; the first fixing portion is fixed to the first insulating block; the first tail portion extends beyond the first insulating block;

the plurality of first conductive terminals comprise a plurality of pairs of first differential signal terminals, a plurality of first ground terminals and a plurality of second ground terminals; two sides of each pair of first differential signal terminals are associated with one first ground terminal and one second ground terminal, respectively;

the first ground sheet comprises a first base portion; the first base portion comprises a first contact portion in contact with the first fixing portion of the first ground terminal, a second contact portion in contact with the first fixing portion of the second ground terminal, and a first raised portion connecting the first contact portion and the second contact portion; the first raised portion is configured to avoid the first differential signal terminals;

the second ground sheet comprises a second base portion; the second base portion comprises a third contact portion in contact with the first fixing portion of the first ground terminal, a fourth contact portion in contact with the first fixing portion of the second ground terminal, and a second raised portion connecting the third contact portion and the fourth contact portion; the second raised portion is configured to avoid the first differential signal terminals;

each pair of first differential signal terminals are circumferentially surrounded by a first annular shielding cavity formed by the first ground terminal, the second ground terminal, the first ground sheet and the second ground sheet.

15. The connector assembly according to claim 14, wherein the first elastic contact arm of the first ground terminal defines a first through hole; the first elastic contact arm of the second ground terminal defines a second through hole;

the first ground sheet comprises a first grounding elastic arm extending from the first contact portion and a second grounding elastic arm extending from the second contact portion; the first grounding elastic arm is inserted into the first through hole to be in contact with the first elastic contact arm of the first ground terminal; the second grounding elastic arm is inserted into the second through hole to be in contact with the first elastic contact arm of the second ground terminal.

16. The connector assembly according to claim 15, wherein the electrical connector comprises a second terminal module; the second terminal module comprises a second insulating block, a plurality of second conductive terminals fixed to the second insulating block, a third ground sheet fixed to one side of the second insulating block, and a fourth ground sheet fixed to another side of the second insulating block; the plurality of conductive terminals comprise the plurality of second conductive terminals;

each second conductive terminal comprises a second fixing portion, a second elastic contact arm extending from one end of the second fixing portion, and a second tail portion extending from another end of the second fixing portion; the second fixing portion is fixed to the second insulating block; the second tail portion extends beyond the second insulating block;

the plurality of second conductive terminals comprise a plurality of pairs of second differential signal terminals, a plurality of third ground terminals and a plurality of fourth ground terminals; two sides of each pair of second differential signal terminals are associated with one third ground terminal and one fourth ground terminal, respectively;

the third ground sheet comprises a third base portion; the third base portion comprises a fifth contact portion in contact with the second fixing portion of the third ground terminal, a sixth contact portion in contact with the second fixing portion of the fourth ground terminal, and a third raised portion connecting the fifth contact portion and the sixth contact portion; the third raised portion is configured to avoid the second differential signal terminals;

the fourth ground sheet comprises a fourth base portion; the fourth base portion comprises a seventh contact portion in contact with the second fixing portion of the third ground terminal, an eighth contact portion in contact with the second fixing portion of the fourth ground terminal, and a fourth raised portion connecting the seventh contact portion and the eighth contact portion; the fourth raised portion is configured to avoid the second differential signal terminals;

each pair of second differential signal terminals are circumferentially surrounded by a second annular shielding cavity formed by the third ground terminal, the fourth ground terminal, the third ground sheet and the fourth ground sheet.

17. The connector assembly according to claim 16, wherein the second elastic contact arm of the third ground terminal defines a third through hole; the second elastic contact arm of the fourth ground terminal defines a fourth through hole;

the third ground sheet comprises a third grounding elastic arm extending from the fifth contact portion and a fourth grounding elastic arm extending from the sixth contact portion; the third grounding elastic arm is inserted into the third through hole to be in contact with the second elastic contact arm of the third ground terminal; the fourth grounding elastic arm is inserted into the fourth through hole to be in contact with the second elastic contact arm of the fourth ground terminal.

18. The connector assembly according to claim 16, wherein a side of the first insulating block facing the second terminal module defines a plurality of first grooves extending upwardly;

a side of the second insulating block facing the first terminal module defines a plurality of second grooves extending upwardly;

the electrical connector comprises a first connection block; the first connection block comprises a middle portion, a plurality of first convex ribs protruding from the middle portion to one side, a plurality of second convex ribs protruding from the middle portion to an opposite side; the first convex ribs are inserted in the first grooves of the first insulating block; and the second convex ribs are inserted in the second grooves of the second insulating block.

* * * * *